(12) United States Patent
Mohammed et al.

(10) Patent No.: US 12,092,519 B2
(45) Date of Patent: Sep. 17, 2024

(54) ALL-OPTICAL LIGHT FIELD SAMPLING WITH ATTOSECOND RESOLUTION

(71) Applicant: Arizona Board of Regents on behalf of the University of Arizona, Tucson, AZ (US)

(72) Inventors: Mohammed Tharwat Hassan Mohammed, Tucson, AZ (US); Dandan Hui, Tucson, AZ (US); Husain Alqattan, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 18/557,871

(22) PCT Filed: Apr. 27, 2022

(86) PCT No.: PCT/US2022/026441
§ 371 (c)(1),
(2) Date: Oct. 27, 2023

(87) PCT Pub. No.: WO2022/232210
PCT Pub. Date: Nov. 3, 2022

(65) Prior Publication Data
US 2024/0230419 A1 Jul. 11, 2024

Related U.S. Application Data

(60) Provisional application No. 63/181,526, filed on Apr. 29, 2021.

(51) Int. Cl.
*G01J 11/00* (2006.01)
*H01S 3/00* (2006.01)

(52) U.S. Cl.
CPC ............ *G01J 11/00* (2013.01); *H01S 3/0014* (2013.01)

(58) Field of Classification Search
CPC .............................. G01J 11/00; H01S 3/0014
(Continued)

(56) References Cited

U.S. PATENT DOCUMENTS 7,567,596 B2 * 7/2009 Dantus ............... G01B 9/02091
372/27
9,658,443 B2 * 5/2017 Broxton ................. H04N 23/00
(Continued)

FOREIGN PATENT DOCUMENTS

WO 2013072875 A2 5/2013
WO 2022232210 A1 11/2022

OTHER PUBLICATIONS

Hassan et al., Invited Article: Attosecond Photonics: Synthesis and Control of Light Transients, Review of Scientific Instruments, 2012, 83(11):111301, pp. 1-19.
(Continued)

*Primary Examiner* — Isiaka O Akanbi
(74) *Attorney, Agent, or Firm* — Quarles & Brady LLP; Yakov Sidorin

(57) ABSTRACT

System and method configured for real-time, direct, all-optical methodology of measurement of a temporal profile of optical field. In one case, such measurement is carried out by recording electronic delay response of a target material system triggered by a strong driving optical field (in particular—by pulsed light with sub-femtosecond pulses containing a few cycles of optical field each). A corresponding all-optical metrological tool configured to operate with (sub-)femtosecond resolution. Demonstration of the on-demand sub-femtosecond electron motion control in solid-state with the use of synthesized waveforms of optical field.

20 Claims, 10 Drawing Sheets

(58) Field of Classification Search
USPC .................................. 356/350, 237.2, 432
See application file for complete search history.

(56) References Cited

U.S. PATENT DOCUMENTS

| | | | | |
|---|---|---|---|---|
| 10,658,148 | B2* | 5/2020 | Mohammed | H01J 37/073 |
| 2006/0056468 | A1 | 3/2006 | Dantus et al. | |
| 2013/0314717 | A1* | 11/2013 | Yi | G01N 21/64 356/479 |
| 2014/0128859 | A1 | 5/2014 | Lee | |
| 2015/0123010 | A1* | 5/2015 | Hirsch | H01J 1/304 250/424 |
| 2017/0123291 | A1* | 5/2017 | Vampa | G02F 1/3556 |
| 2017/0271123 | A1* | 9/2017 | Talebi Sarvari | H01J 37/244 |
| 2019/0242819 | A1* | 8/2019 | Frumker | H01S 3/005 |
| 2019/0333731 | A1* | 10/2019 | Mohammed | H01J 37/045 |
| 2020/0025677 | A1* | 1/2020 | Prater | G01N 21/65 |
| 2020/0284724 | A1* | 9/2020 | Dholakia | G02B 21/0032 |
| 2020/0342205 | A1* | 10/2020 | Park | G01N 21/6458 |
| 2020/0384287 | A1 | 12/2020 | Hetz | |
| 2021/0389244 | A1* | 12/2021 | Bowman | G01S 17/894 |

OTHER PUBLICATIONS

Hassan et al., Optical Attosecond Pulses and Tracking the Nonlinear Response of Bound Electrons, Nature, 2016, 530(7588):66-70.

Noda et al., SALMON: Scalable Ab-Initio Light-Matter Simulator for Optics and Nanoscience, arXiv preprint arXiv:1804.01404v1, 2018, pp. 1-19.

Runge et al., Density-Functional Theory for Time-Dependent Systems, Physical Review Letters, 1984, 52(12):997-1000.

Schiffrin et al., Optical-Field-Induced Current in Dielectrics, Nature, 2013, 493(7430):70-74.

PCT International Search Report and Written Opinion, PCT/US2022/026441, Jul. 26, 2022, 11 pages.

* cited by examiner

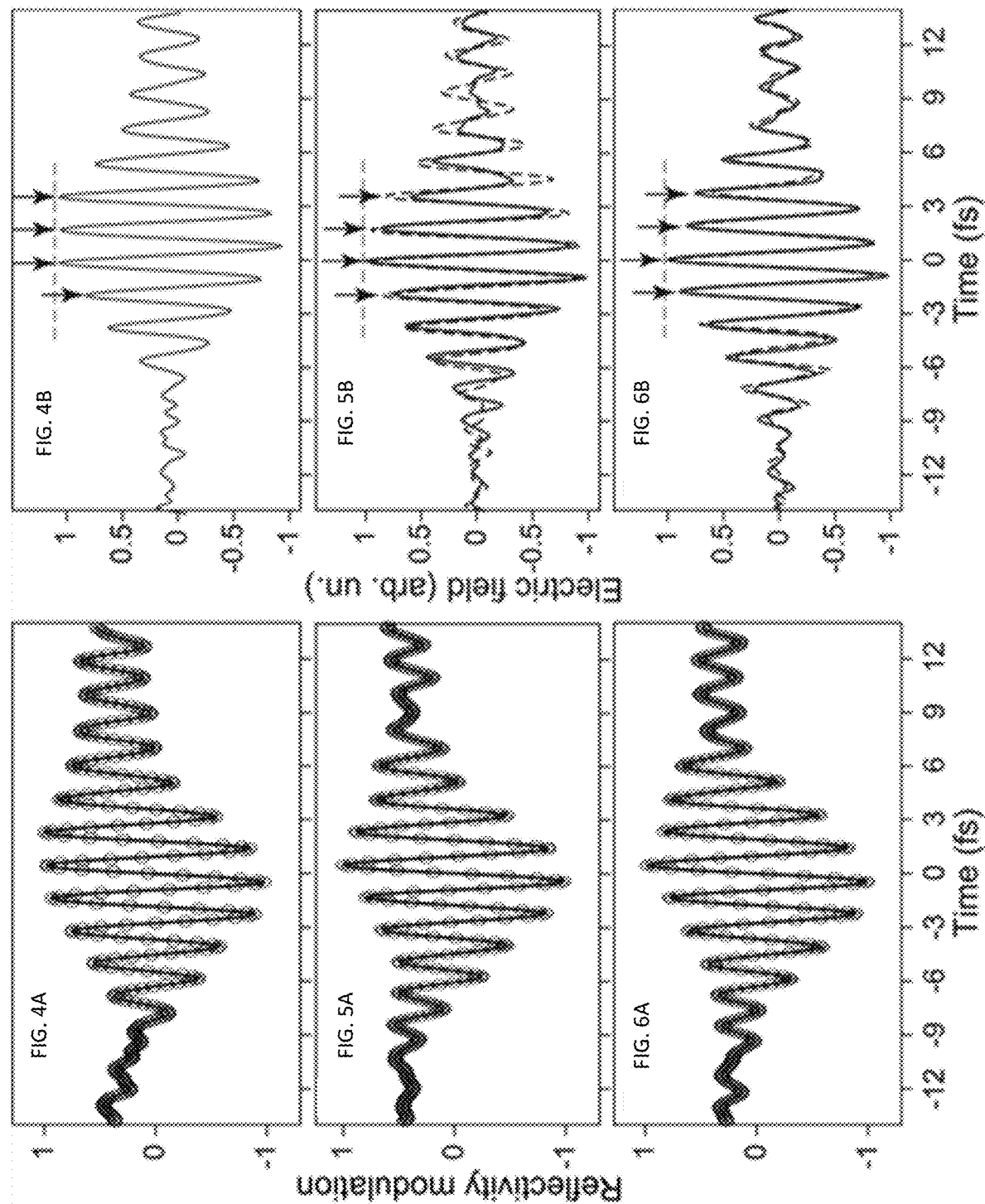

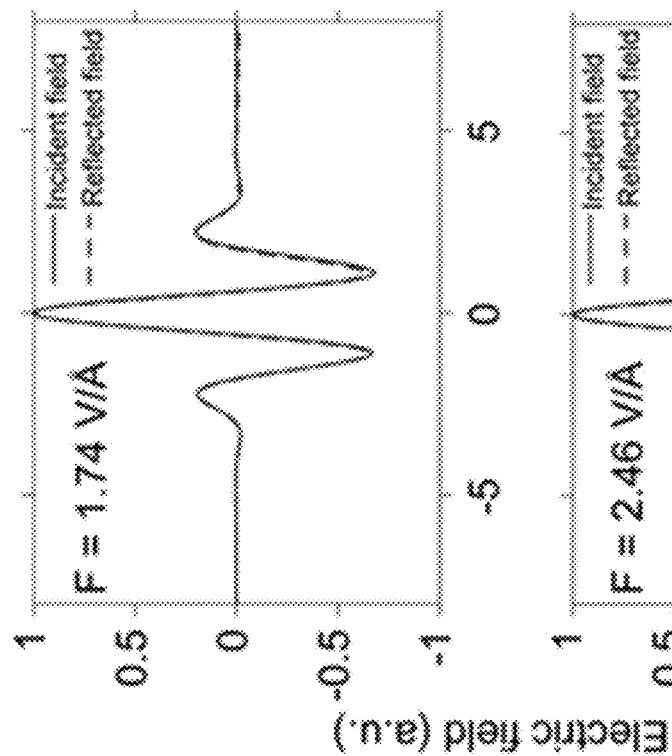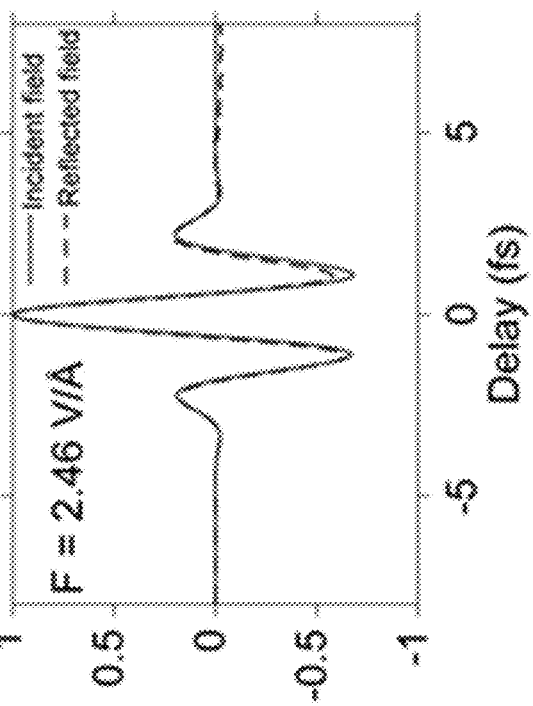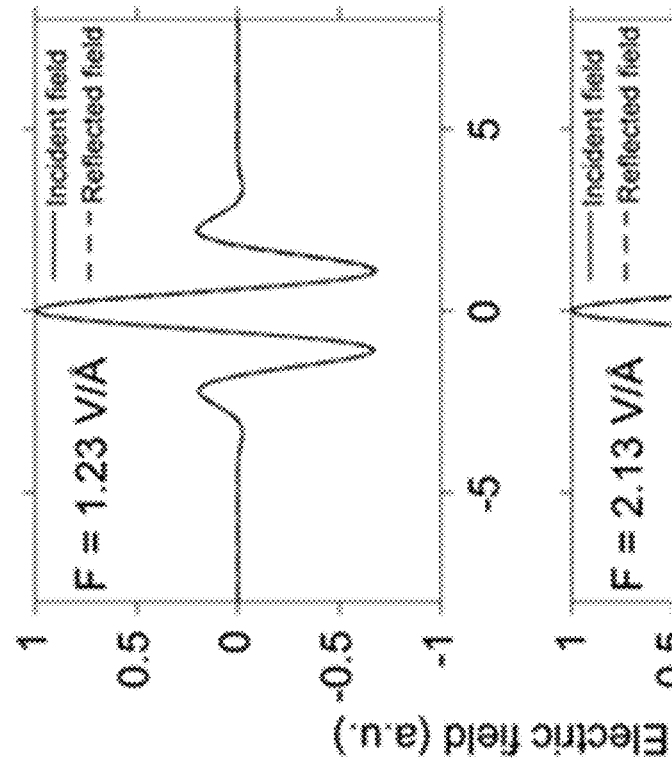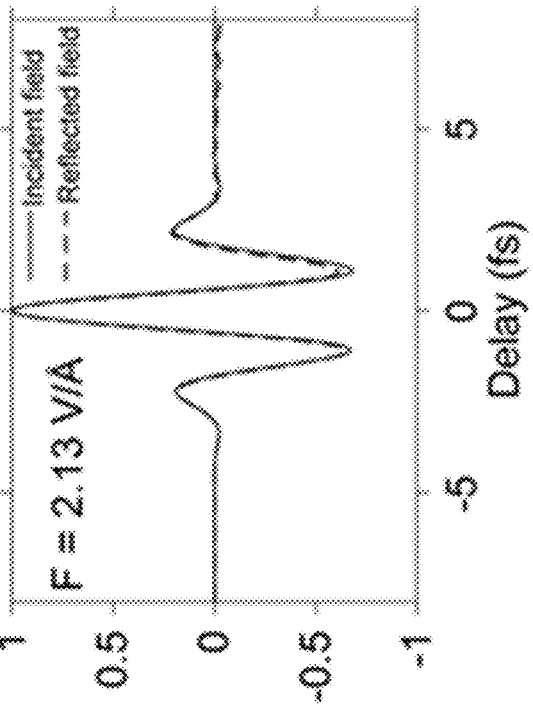

ALL-OPTICAL LIGHT FIELD SAMPLING WITH ATTOSECOND RESOLUTION

CROSS-REFERENCE TO RELATED APPLICATIONS

This US Patent Application is a national phase of the International Application No. PCT/US2022/026441 filed on Apr. 27, 2022 and published as WO 2022/232210, which claims priority of and benefit from the U.S. Provisional Patent Application No. 63/181,526 filed on Apr. 29, 2021. The disclosure of each of the above-identified patent documents is incorporated herein by reference.

STATEMENT CONCERNING FEDERALLY SPONSORED RESEARCH AND DEVELOPMENT

This invention was made with government support under grant number FA9550-19-1-0025 awarded by USAF/AFOSR. The government has certain rights in the invention.

RELATED ART

The advancement in the attosecond pulses generation and spectroscopic measurements with high harmonic generation in gases and solids opened an opportunity to study the electronic response driven by strong fields in real time. The strong-field-induced electron dynamics and the related phase transition to a semimetal-like state of the dielectric systems have been studied theoretically and experimentally with the use of extreme-UV (XUV) attosecond spectroscopy. The strong field interaction induces a current in dielectric nanocircuit as was demonstrated, for example, by A. Schiffrin et al. (in Optical-field-induced current in dielectrics; *Nature* 493, 70-74; 2013), and is therefore considered to be used for the detection of the carrier-envelope-phase (CEP) and the waveform of the driving optical pulses with a few cycles of the optical field pulses. The strong field interaction with thin dielectric films of $SiO_2$ has been utilized to generate a wideband coherent EUV radiation extended up to 40 eV. In strong light field the dielectric material experience a phase transition and change in reflectivity following the field of the pulsed radiation impinging on such material. To this end, as will be understood by a skilled artisan, FIG. 1A schematically illustrate light-field induced carrier excitation mechanism, and FIG. 1B schematically depicts the electron motion dynamics, in the reciprocal space at the strong and critical strong field strengths, respectively.

SUMMARY

Embodiments of the invention provide an apparatus that includes an illumination system and a light-collection system. The illumination system contains a source of light configured to generate an input beam of light carrying light pulses of femtosecond duration or even a shorter duration, as well as a light-divider component structured to spatially-divide an input beam of light into a drive beam of light and a probe beam of light. The illumination system additionally includes a first optical system configured to change a degree of divergence of at least one of the drive beam of light and the probe beam of light and direct these beams of light towards a predetermined spatial location. At the same time, the light-collection system is configured to acquire the pulses of light (from the probe beam of light) that have arrived from the predetermined spatial location. The apparatus additionally contains a microprocessor or programmable electronic circuitry that is operably cooperated with a tangible non-transitory storage medium carrying program code thereon (such program code is configured, when loaded to the programmable electronic circuitry, to enable the electronic circuitry to acquire an output—from the light-collection system—that represents a time-dependent characteristic of the light that has arrived from the predetermined spatial location, and to produce an image representing a response, generated by a medium at the predetermined spatial location, to the drive beam of light. In at least one implementation, the apparatus is configured to satisfy at least one of the following conditions: (a) the light-collection system includes at least one of a lens and a reflector, and an optical detector; (b) the illumination system includes at least one of a refractive optical component and an optical reflector in the first optical system, and a time-delay relay that is juxtaposed to the first optical system and connected to the electronic circuitry or microprocessor and that is configured to introduce a phase delay between a drive optical field in the drive beam of light and a probe optical field in the probe beam of light; and (c) the source of light includes a laser configured to generate attosecond pulses of light, such that attosecond pulses include at least half cycle of optical field oscillation. Alternatively or in addition, and substantially in every implementation of the apparatus, the light collection system may include a spatial filter positioned to block light from the drive beam of light while transmitting light from the probe beam of light. Alternatively or in addition, and substantially in every embodiment of the apparatus, the program code may be configured to govern the electronic circuitry/microprocessor to perform at least the following actions: (i) to operate the time-delay relay to vary the phase delay between the drive optical field and the probe optical field; and (ii) to set a variable threshold value of intensity of optical field to be registered at the light-collection system, the threshold value being defined such that the light-collection system generates an indicia of a registered optical signal only when an intensity of an optical field from the probe beam of light acquired at the light-collection system exceed said threshold.

Embodiments of the invention additionally provide a method for acquiring and/or registering a response or characteristic of a target non-electrically-conducting material or sample on a femtosecond time-scale. The method includes a step of modulating an optical characteristic of the target material by irradiating the target material with a first pulse of a drive optical field (where such drive optical field is configured to include pulsed light in a form of pulse(s) containing at least half optical field cycle; a step of illuminating the target material with a second pulse of a probe optical field that is substantially coherent with the drive optical field; a step of acquiring—with an optical detection system that includes at least an optical detector—light from the probe optical field that has interacted with the target material to identify a peak of time-dependent distribution of such light; and a step of producing an image (representing response and/or characteristic of the target material) based at least on an output from the optical detection system. In at least one implementation of the method, the response and/or characteristic of the target material includes an optical characteristic represented by at least one of optical reflectivity and optical transmissivity, and/or a step of acquiring includes collecting light from the probe optical field in at least one of reflection from and transmission through the target material/sample. Alternatively or in addition, and substantially in every implementation of the method, the step of irradiating may optionally be carried out simultaneously with the step of modulating; and/or to be configured such that at least one of the steps of modulating and illuminating includes subjecting the target material/sample to interaction with a corresponding pulse of light having a femtosecond duration or a shorter duration. Alternatively or in addition—and substantially in every implementation of the method—the method may be configured to satisfy one or more of the following conditions: (i) the method includes a step of introducing a time delay between the first pulse and the second pulse prior to or simultaneously with at least one of the steps of modulating and illuminating; and (ii) to produce (as a result of at least one of the irradiating the target material/sample with the first pulse and the illuminating of the target material with the second pulse) the drive optical field and the probe optical field that are spatially overlapped at the target material/sample. At least when at least one of these above-identified conditions is satisfied, the method may be optionally configured to include a step of varying the time delay to produce the image in which modulation of the optical characteristic of the target material is presented in a time-dependent fashion with at least a femtosecond temporal resolution. Furthermore, substantially in every implementation of the method the target sample/material may be configured to carry and/or incorporate electrically-conducting members on the opposing of the sample/material, in which case the method may additionally include the step of measuring (with the use of such electrically-conducting members) variations of an electrical parameter caused at the target material at least by the irradiating the target sample with the drive optical field. Alternatively or in addition, an embodiment of the may include one or more of the following:—spatially splitting an input beam of light into a first beam of light carrying the drive optical field and a second beam of light carrying the probe optical field; and—spatially-independently changing a degree of spatial divergence of at least one of the first and second beams of light. In the latter case, the action of spatially splitting the input beam of light may include traversing the input beam of light through first and second apertures in a substantially optically opaque screen.

Embodiments of the invention also provide an apparatus containing an illumination system (that includes: an input configured to receive an input beam of light carrying input light pulses; a light-divider component structured to spatially-divide the input beam of light received at the input into a drive beam and a probe beam; and a first optical system configured to change a degree of divergence of at least one of the drive beam and the probe beam and direct the drive and probe beams towards a predetermined spatial location), a light-collection system disposed to acquire light of the probe beam that has arrived to the light-collection system from the predetermined spatial location; and a programmable electronic circuitry operably cooperated with a tangible non-transitory storage medium containing program code thereon. This program code, when loaded to the programmable electronic circuitry, enables the electronic circuitry to acquire an output from the light-collection system (such output representing time-dependent optical characteristic of a medium at the predetermined spatial location); and to produce in real time an image representing a temporal profile of an optical field of the drive beam. At least in one implementation, the apparatus is configured to generate such temporal profile with a femtosecond temporal resolution or a sub-femtosecond temporal resolution and/or further comprises a source of light configured to generate the input beam carrying the input light pulses that have a femtosecond duration or a sub-femtosecond duration. (In one specific implementation, the source of light may be configured (i) to spatially separate a first beam of light having a first spectral bandwidth into a plurality of second beams of light, a second beam of such plurality of the second beams of light having a corresponding second spectral bandwidth, wherein the first beam of light is a beam of pulsed laser light; (ii) to individually compress light pulses of at least two second beams, of the plurality of the second beams, to form a plurality of third beams of light, wherein each third beam respectively corresponds to one of the second beams, wherein each third beam contains compressed light pulses having a corresponding compressed duration; and (iii) to collinearly and temporally-coherently overlap at least two of the third beams to form a fourth beam of light, the fourth beam carrying the input light pulses. Alternatively or in addition, and at least in one implementation, the apparatus satisfies one or more of the following conditions: (a) the source of light is configured to spatially separate the first beam of light into the plurality of the second beams of light by spatially separating the first beam of light into the plurality of the second beams of light while second spectral bandwidths, corresponding to different second beams, do not overlap with one another; (b) the source of light is configured to individually compress the light pulses of the second beams by individually compressing light pulses of each of the second beams; (c) the source of light is configured to collinearly and temporally-coherently overlap at least two of the third beams by collinearly and temporally-coherently overlapping all of the third beams; and (d) the source of light is configured to individually compress the light pulses of the second beams by carrying out at least one of the following: (1) forming the plurality of third beams in which each of the compressed durations is shorter than 10 femtoseconds, and (2) spatially separating the second beams from one another to pass the second beams along corresponding optical paths that differ from one another. Alternatively or in addition, and at least in one specific implementation, the source of light may include a laser configured to generate attosecond pulses of light with a pulse including at least half a cycle of optical field oscillation. Furthermore, alternatively or in addition, and substantially in every implementation of the apparatus, the light-collection system may include at least one of a lens and a reflector, and an optical detector; and/or the illumination system may include (at least one of a refractive optical component and an optical reflector in the first optical system, and a time-delay relay that is juxtaposed with the first optical system and connected to the electronic circuitry and that is configured to introduce a phase delay between a drive optical field of the drive beam and a probe optical field of the probe beam). When the latter case is realize, the program code may be judiciously configured to govern the electronic circuitry to perform at least the following actions:—to operate the time-delay relay to vary the phase delay between the drive optical field and the probe optical field; and—to define a variable threshold value of intensity of optical field to be registered with the light-collection system, wherein the threshold value defined such that the light-collection system generates an indicia of a registered optical signal only when an intensity of an optical field of the probe beam acquired at the light-collection system exceeds such threshold value. Moreover, substantially in every implementation of the apparatus, the light-collection system may include a spatial filter positioned to substantially block light from the drive beam while passing light from the probe beam to an optical detection system of the light-collection system, and/or the program code may be configured to produce a first image representing a material response of a medium located at the predetermined spatial location to being irradiated with the drive beam, and to transform such first image to the image of the temporal profile of the drive optical field.

Embodiments of the invention additionally provide a method that includes a step of receiving the input beam of light at the input of the apparatus structured according to an embodiment described above; and a step of producing an image representing a temporal profile of a drive optical field of a drive beam with the use of such apparatus. The producing of the image representing a temporal profile of a drive optical field of a drive beam is effectuated by performing at least the following actions: (a) modulating an optical characteristic of a target material positioned at the predetermined spatial location by irradiating the target material with a first pulse of the drive optical field of the drive beam of light (here, the drive optical field is configured to include pulsed light containing at least half a cycle of the drive optical field); (b) illuminating the target material with a second pulse of a probe optical field of a probe beam of light, (here, the probe optical field being substantially coherent with the drive optical field); and (c) with an optical detector of the light-collecting system of the apparatus, acquiring light of the probe beam that has interacted with the target material to image a temporal profile of said drive optical field. Alternatively or in addition, and at least in one implementation of the method, the step of acquiring may include collecting light of the probe beam in at least one of reflection from and transmission through the target sample, and the method may further include a step of generating an image of the optical characteristic of the target material (here, the optical characteristic is at least one of optical reflectivity and optical transmissivity). In the latter case, the method may additionally include a step of varying a time delay between the first and second pulses to generate the image of the optical characteristic of the target material (here, in such image, a modulation of the optical characteristic of the target material, caused by said irradiating, is presented in a time-dependent fashion with at least a femtosecond temporal resolution or a sub-femtosecond temporal resolution), and/or additionally include a step of transforming the image of the optical characteristic of the target material to the image of the temporal profile of the drive optical field. Alternatively or in addition, and substantially in every implementation of the method, the step of producing an image representing a temporal profile of the optical field of the drive beam may include producing the image representing the temporal profile of the optical field of the drive beam with a femtosecond or sub-femtosecond resolution in real time; and/or the step of illuminating may be carried out substantially simultaneously with the step of modulating. In at least one specific embodiment, the steps of modulating and illuminating may include subjecting the target material to interaction with a corresponding pulse of light having a femtosecond duration or a sub-femtosecond duration. Alternatively or in addition, and substantially in every implementation of the method, at least one of the following conditions may be satisfied: (a) the method includes introducing a time delay between the first pulse and the second pulse prior to or simultaneously with at least one of the steps of modulating and illuminating; and (b) the method includes spatially overlapping the drive beam and the probe beam at the target material by the steps of irradiating and illuminating. In at least one specific implementation, the may include one or more of: (i) spatially splitting the input beam of light into the drive beam carrying the drive optical field and the probe beam carrying the probe optical field; and (ii) spatially-independently changing a degree of spatial divergence of at least one of the drive and probe beams. The action of spatially splitting may include passing the input beam of light through first and second apertures in a substantially optically opaque screen. In one specific case, the method is devoid of using a second harmonic of the drive optical field and/or a third harmonic of the drive optical field and/or using a phase-retrieval algorithm. In one specific case, the image representing the temporal profile of the drive optical field represents an oscillating function but does not represent an envelope of such oscillating function.

BRIEF DESCRIPTION OF THE DRAWINGS

The invention will be more fully understood by referring to the following Detailed Description of Specific Embodiments in conjunction with the Drawings, of which:

FIG. 3A: The normalized measured reflectivity modulation of the $SiO_2$ substrate under the influence of the strong field of a few-cycle pulse. Each point represents the integration of the probe beam spectrum measured at each time delay between the pump and probe pulses. FIG. 3B: The measured reflectivity modulation traces in a time window between −2.6 fs and 3.2 fs at different strengths of the drive field (0.78 V/Å, 0.96 V/Å, and 1.1 V/Å, are shown as trace lines 1, 2, and 3, respectively. The relative delay responses between these measured traces are 425±98 attoseconds and 575±45 attoseconds. FIG. 3C is a curve representing the driver pulse-field retrieved from the derivative of the reflectivity modulation measurement in FIG. 3A. FIG. 3D includes plots representing the calculated numbers of excited carriers $n_{ex}(t)$ triggered by field with different field strengths and shown in contrast to the instantaneous intensity ($E^2$) of the driver field (which is plotted in a black dashed line).

FIGS. 4A, 4B, 5A, 5B, 6A, 6B provide illustration of the all-optical methodology of light-field sampling.

FIGS. 4A, 4B address the normalized measured reflectivity modulation induced by a waveform WF1 synthesized with the use of light field synthesizer, LFS, and the retrieved electrical field of such waveform WF1, respectively.

FIGS. 5A, 5B illustrate, respectively, the normalized measured reflectivity modulation induced by a waveform WF2 synthesized with the use of LFS, and the retrieved electrical field of such waveform WF2 after moving $Ch_{VIS-UV}$ with respect to the other channels in LFS by −2 fs, from the four channels phase setting of WF1. Here, the sampled field of WF2 is plotted in the red line, and the expected field of WF2 is plotted in the black dashed line. The expected and measured fields have similar main features. By comparing the WF1 and WF2 in FIGS. 4B and 5B with one another, the introduced phase delay of the $Ch_{VIS-UV}$ can be seen to modify the relative amplitudes of the main four peaks corresponding to the field half-cycles (pointed by small black arrows). The gray dashed line shows the maximum amplitude of the field for eye guidance.

FIG. 6A represents the measured reflectivity modulation altered by a waveform (WF3) synthesized from WF2 by shifting the $Ch_{DUV}$ with respect to the other channels in LFS by −2 fs. FIG. 6B depicts the synthesized waveform WF3 in a red line), while the corresponding expected calculated field is shown in the black dashed line. The relative amplitude of the half-cycles in both sides of the main half-cycle changed from WF2 to WF3.

FIG. 12A, 12B, 12C, 12D: The simulated reflected field from the target non-electrically-conducting sample is plotted in comparison with the strong driver field at different field strengths. The standard deviations of the difference between the calculated reflected and incident fields are 0.2%, 0.5%, 1%, and 1.35% at field strength 1.23, 1.74, 2.13, and 2.46 V/Å, respectively. The significant agreement proves that the reflectivity modulation of the dielectric follows exactly the shape of the driver field.

Figure 1B:
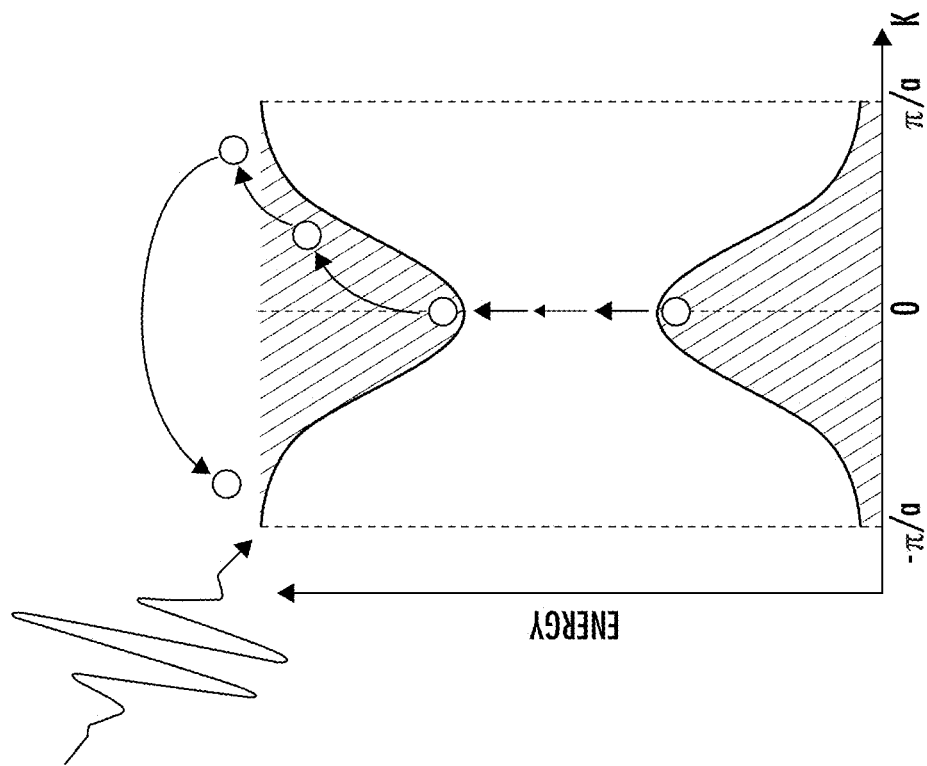
FIGS. 1A and 1B schematically illustrate light-field induced carrier excitation mechanism (FIG. 1A) and the electron motion dynamics (FIG. 1B) in the reciprocal space at the strong and critical strong field strengths, respectively.
Figure 1A:
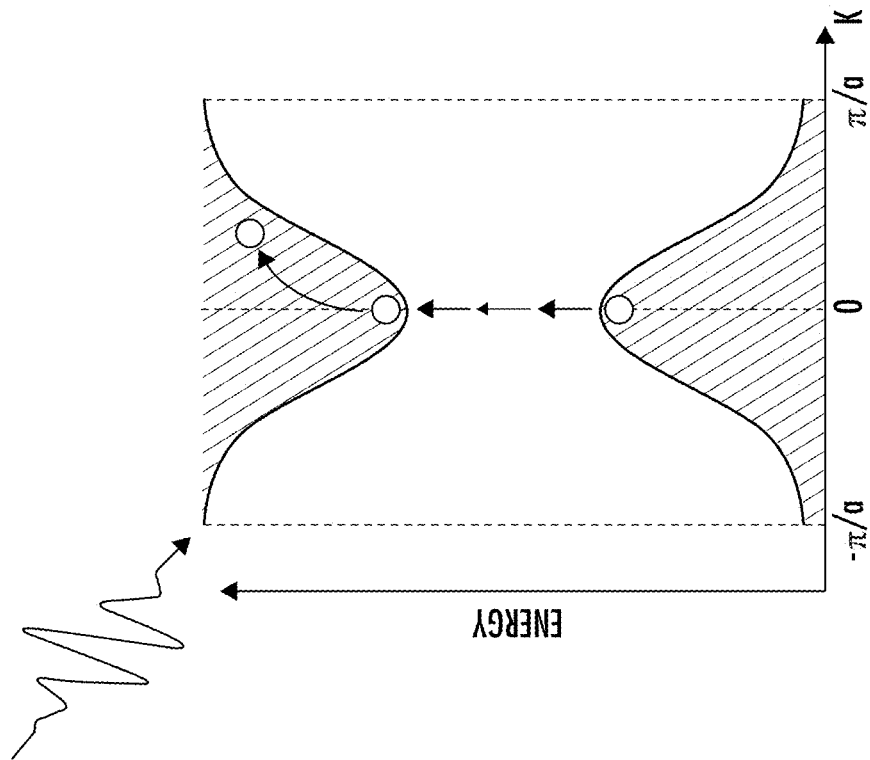

Generally, like elements or components in different Drawings may be referenced by like numerals or labels and/or the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Implementations of the present invention stem from the realization that the optical property (such as reflectivity and/or transmissivity) of the non-electrically-conducting material changes in real time following the optical driving field (as a result of change or shift of the wave vector of the electrons in a non-electrically-conducting material at a certain critical strength of such driver field, which causes a semimetal-like transition in the material and the alteration of its dielectric constant).

It is realized, therefore, that the ability to directly measure—in a time-resolved fashion—such optical characteristic may reveal electron motion induced in such target material by the driver field with strength above a certain level and, therefore, provide a measure of time-dependent variation of optical field in real-time.

For the purposes of this disclosure and accompanying claims, a real-time performance of a system is understood as performance which is subject to operational deadlines from a given event to a system's response to that event. For example, a real time use of information representing reflectivity of a given object (such as a piece of material, for example) collected a buffer or data storage associated with an optical detection system may be one triggered by the user or microprocessor and executed simultaneously with and without interruption of a process of illumination or irradiation of the object during which such information is being or has been acquired and recorded. The term "image" refers to and is defined as an ordered representation of detector signals corresponding to spatial and/or positions. For example, an image may be an array of values within an electronic memory, or, alternatively, a visual image may be formed on a display device X such as a video screen or printer. The term "X and/or Y" is defined as and embraces the situations including any of the following: "only X", "only Y", "both X and Y".

Accordingly, the inability of related art to directly register or observe, in real time, the temporal profile of oscillations of optical field (and not an envelope to the oscillations of optical field) has been solved by directly, in real time measuring a modulation of reflectivity and/or transmissivity that represent an optical field driven electronic response and the related modulation of the dielectric constant of a non-electrically-conducting material (generally—a dielectric material such as, in a non-limiting example, silica; in some specific cases—a semiconductor material caused by a strong few-optical-field-cycles-containing pulse of optical field used as a pump/drive field, at different field strengths.

The pump beam (interchangeably referred to herein as a drive beam) having the pump/drive optical field was employed to modify the optical properties of the target material, which are thoroughly examined by another, weak probe beam (having a corresponding probe or drive optical field characterized by strength that was lower, or weaker, than the strength of the field of the drive beam; the typical ranges of these field strengths are discussed below). The integral of the spectrum of the probe beam measured in reflection from (and/or in transmission through) the target sample is assessed at each instant of time to obtain an image or trace of reflectivity modulation. The determination of the relative electronic delay response is carried out by measuring the shift in phase delay between the reflectivity modulation traces under the same experimental conditions at different pump field strengths. Based on such real time measurements, embodiments of the invention implement all-optical (that is, based only on optical effects and optical interactions) methodology of sampling of oscillations of light field with femtosecond—or even attosecond—temporal resolution and without the use of any phase-extraction algorithm. Furthermore, embodiments manifest in system and method for light field synthesis, with which (using complex synthesized waveforms) the electron motion in a dielectric (in one example) material is controlled to demonstrate a switch that is reconfigurable on demand.

As discussed further in detail below, embodiments of the invention use the extreme nonlinearity of strong optical field, driven by few-field-cycle optical pulses, to attain attosecond temporal resolution and give access to the electron motion dynamics of matter in real time. (An example of the source of such optical field is addressed in the section on Supplemental Information.) To this end, the electronic delay response of a non-electrically-conducting material system (demonstrated with the use of a target dielectric material system) was triggered on demand by a strong optical field configured to contain few-cycle pulses with a femtosecond duration (and, in one specific example, with an attosecond duration—on the order of 425±98 attoseconds) and used to demonstrate all-optical light field sampling metrology with corresponding attosecond resolution.

Embodiment(s) of an all-Optical Measurement System of the Invention

Figure 2:
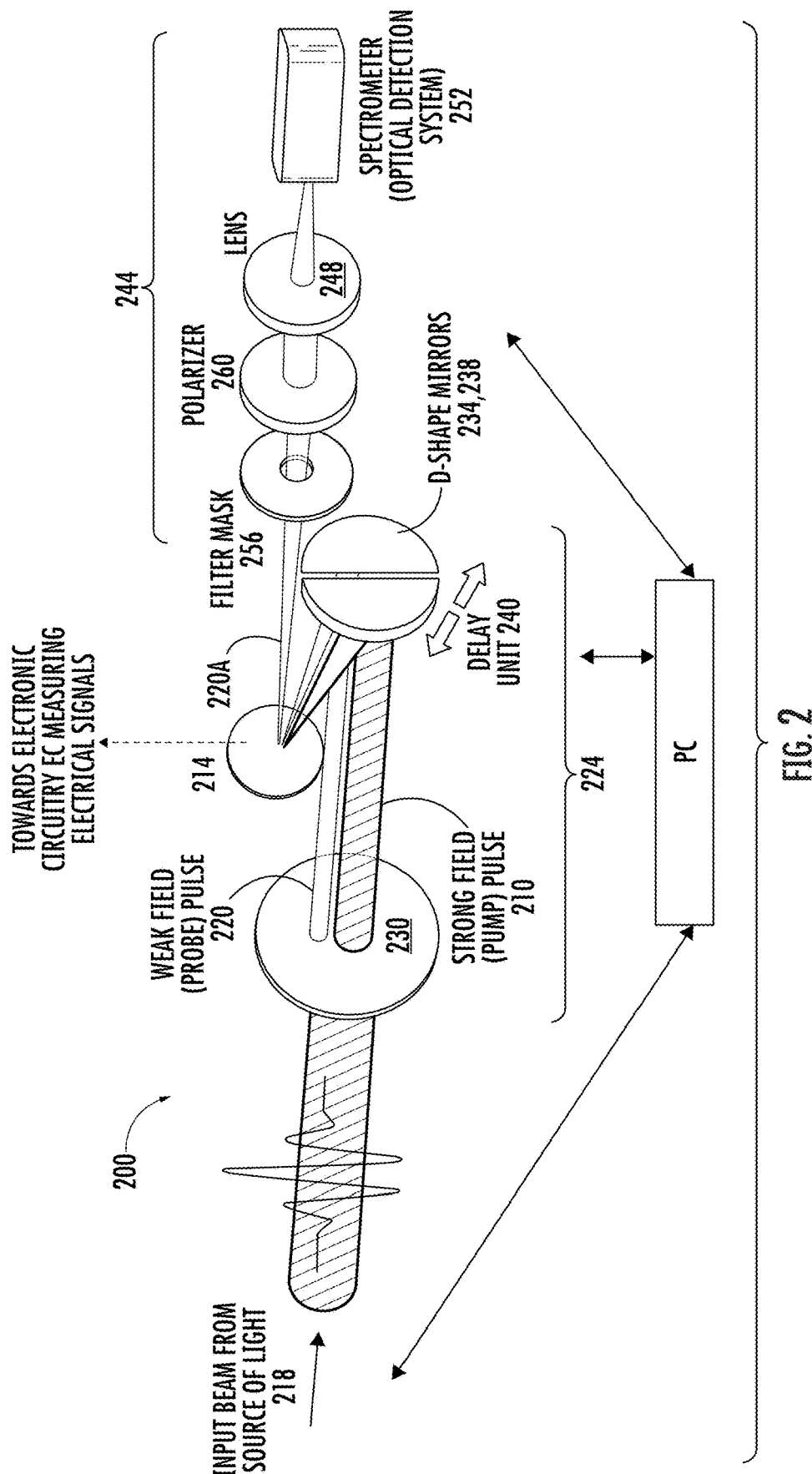
FIG. 2 is a schematic of a system configured to induce and measure the delay response of an electron and all-optical field sampling of such response. The main beam is split by a mask into two strong (pump) and weak (probe) beams. The two beams are focused on a very thin (for example, a 100 micron thin) non-electrically-conducting (in one specific case—dielectric, for example $SiO_2$ based) substrate. One of these D-shape mirrors is connected to a piezo-stage to control the relative delay between the pump and probe pulses with attosecond resolution. The reflectivity modulation of the reflected probe beam spectrum from the substrate is measured with the use of an optical detection system (as shown—an optical spectrometer). A polarizer and a one-hole mask are introduced in the probe beam path before the optical detection system to enhance the signal-to-noise ratio of the reflectivity modulation's measurements.

In reference to one specific implementation 200 of the system of the invention, schematically illustrated in FIG. 2, the electronic delay response induced by the drive (or pump) optical field 210 in a target material 214 (shown here as a dielectric $SiO_2$ substrate with thickness of about 100 microns) was registered by measuring the time-resolved modulation of reflectivity of the target material at different strength of the optical field 210.

In this experiment, conducted in an ambient environment, the input beam 218 of pulsed light with pulses carrying few-cycles of optical field delivered from the source of laser light (not shown; in one case—visible light with a spectral band within the range of 500-700 nm, centered at $\Delta$=600 nm, and p-polarized) was transmitted towards the non-electrically-conducting sample 214 through the illumination system 224. In that, the input beam 218 was split into two beams 210, 220 representing mutually-coherent optical fields (the drive field and the probe field, respectively). As shown, such spatial splitting was achieved by passing the beam 218 through a field-divider component 230; here—a two-hole mask 230 designed to have two holes or apertures of different diameters (in one example—3 mm and 1 mm diameters) in an otherwise optically-opaque screen. (In a related example, a non-equal cube-based beam splitter may be used.) The two mutually-coherent optical fields represented by the drive beam 210 and the probe beam 220 emerge from such field-divider component with different intensities. In one specific case, the drive or pump beam 210 had a level of intensity sufficiently high to be able to induce the phase transition and alter the reflectivity of the $SiO_2$ substrate 214 (specifically, the drive beam's field strength was estimated to be 0.78 V/Å, generally within a range from about 0.3 V/Å to about 0.9 V/Å which was substantially lower than the damage threshold of the target material 214).

The second beam 220 (the weak probe beam—as compared to the drive beam in one implementation had the strength of electrical field even lower (of 0.1 V/Å, generally within a range from about 1% to about 15% of the value of the field strength of the drive beam, or lower) than the threshold field strength needed to induce any degree of phase transition in the target sample 214. The two optical beams 210, 220 were spatially-independently focused onto the sample 214 with respectively-corresponding focusing reflectors 234, 238 (f=100 mm each; shown here as D-shaped curved mirrors each dimensioned to intersect only a respectively corresponding beam of the pump and probe beams) while being propagated towards and impinged onto the sample 214 at incident angles <5°. (It is appreciated that, more generally, either a refractive or a reflective optical component can be used to direct the beams 210, 220 onto the sample 214 while changing a degree of spatial divergence of at least one of these beans such that the areas irradiated with these beams substantially—if not completely—overlap with one another). At least one of the light focusing components 234, 238 was attached to a piezo-stage (~nanopositioner(s)) forming a time-relay element 240 to control the delay of a wavefront of one of the drive and probe fields with respect to another with at least femtosecond (and, in a related implementation, with attosecond) resolution.

It is understood that, while the collection of light that has interacted with the target material 214 can generally be performed in transmission through or in reflection from the sample 214, the example of implementation discussed in reference to FIG. 2 was chosen to operate in reflection. Here, only the optical field of the probe beam 220 was collected by the light-collecting optical system 244 after the probe beam 220 has interacted with a portion of the sample 214 (which, generally preferably, was simultaneously irradiated with the drive field of the beam 210. Such reflected probe beam 220A, reflected off of the target sample 214, was collected by the system 244 and focused by the lens 248 and recorded with the optical detection system 252 (shown here to include an optical spectrometer) as a function of the time delay between the pump and probe pulses with a delay step increment of 100 attoseconds.

To ensure that no light from the pump/drive beam 210 that has interacted with the target material 214 reaches the optical detection system 253, the spatial filter 256 may optionally be employed—such as a light-locking screen with an aperture, for example. A light polarizer 256 could be additionally or in the alternative positioned before the optical detection system 252 and a one-opening-containing mask 256 to further filter out the light from the pump/drive beam 210 that has interacted with the sample 214 and to enhance the signal-to-noise ratio in the measurements of the spectral modulation of the optical field carried by the beam 220A.

Preferably programmable electronic circuitry such as a microprocessor or a computer processor (shown in FIG. 2 schematically as "PC") equipped with non-transitory tangible storage medium containing appropriately configured program code(s) was operably cooperated with the system 200 to govern the operation of at least the source of light, the illumination system, the nanopositioner(s) and other mechanical portions of the system, as well as the process of acquisition of images at the optical detection system 252.

Optical Image Acquisition and Real-Time Determination of Electronic Delay Response in Target Sample.

Figure 3A:
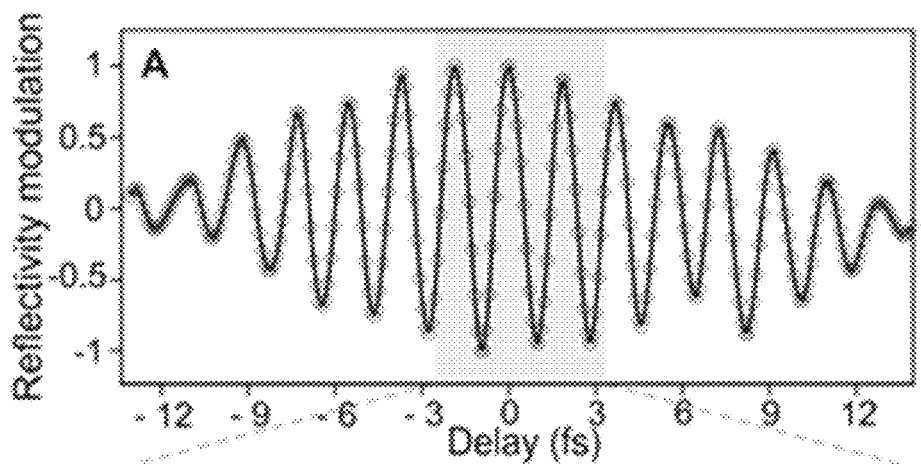
FIGS. 3A, 3B, 3C, 3D provide illustrations of inducement and measurement of the electronic delay response in non-electrically-conducting (for example, a $SiO_2$-based dielectric) system.

Upon acquisition of the probe light 220A that has interacted with the target sample 214 (as shown—acquisition in reflection) at the optical detector of the system 252, the integration of the spectrum of light 220A was performed at each instant of time to obtain an image representing modulation of the reflectivity of the target material 214 (normalized and shown in FIG. 3A); see section on Supplemental Information, below.

Figure 3B:
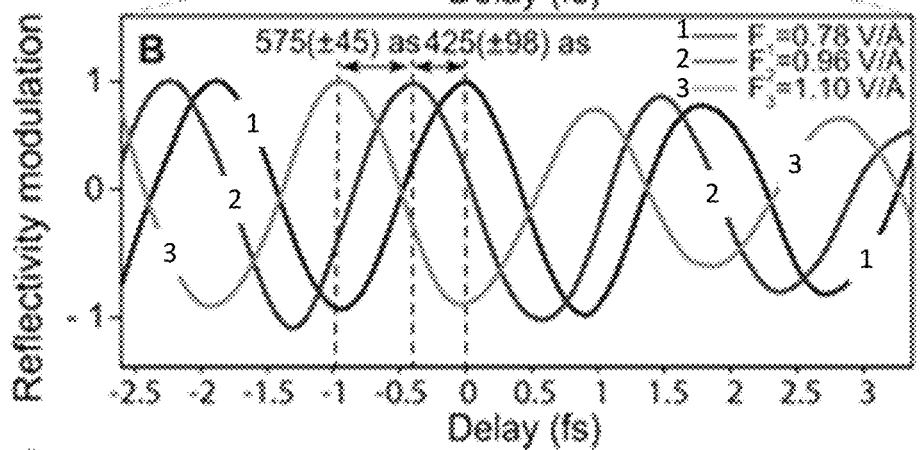

This detected image or trace of reflectivity modulation carries the signature of the electronic response of the non-electrically-conducting material 214 to the influence of/irradiation by the pulse of the driver (pimp) optical field 210. Accordingly, the relative electronic delay response could be determined by measuring the phase delay shift between different reflectivity modulations traces acquired under the otherwise equal experimental conditions but at different field strengths (in several example, the irradiation conditions of the sample 214 with optical fields of $F_1=0.78$ V/Å, $F_2=0.96$ V/Å, and $F_3=1.1$ V/Å were chosen). The intensity of the pump/drive beam 210 was controlled by a neutral density filter introduced in the beam path. The images/traces of the reflectivity modulation were recorded—in a time window ranging from −2.6 to 3.2 fs—as a function of the time delay introduced between the pump and probe pulses with the use of the time-relay 240 with high temporal resolution (delay increments of 25 attoseconds). The reflectivity modulation traces from the average of four recorded measurements at each field strength are plotted in FIG. 3B. The traces exhibit relative phase delays of 425±98 attoseconds and 575±45 attoseconds. Notably, the driver pulse Carrier-Envelope-Phase (CEP) was passively stabilized (measured phase jittering during the measurements is on the order of 100 mrad). Thus, the CEP jittering contribution to this measured relative phase delay was in the standard deviation (SD) merges.

Generally, when the target material 214 was irradiated with the drive optical field at a lower field strength of 0.67 V/Å, for example, no significant reflectivity modulation signal was observed. Notably, the reflectivity-representing signal disappeared and was not recorded by the system 252 when the SiO$_2$ substrate was damaged, so all the presented measurements were collected at field intensity lower than that damage threshold.

Figure 3C:
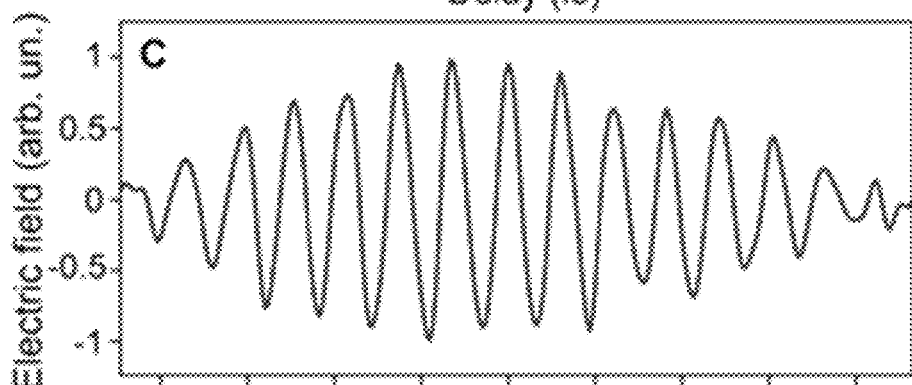
Figure 3D:
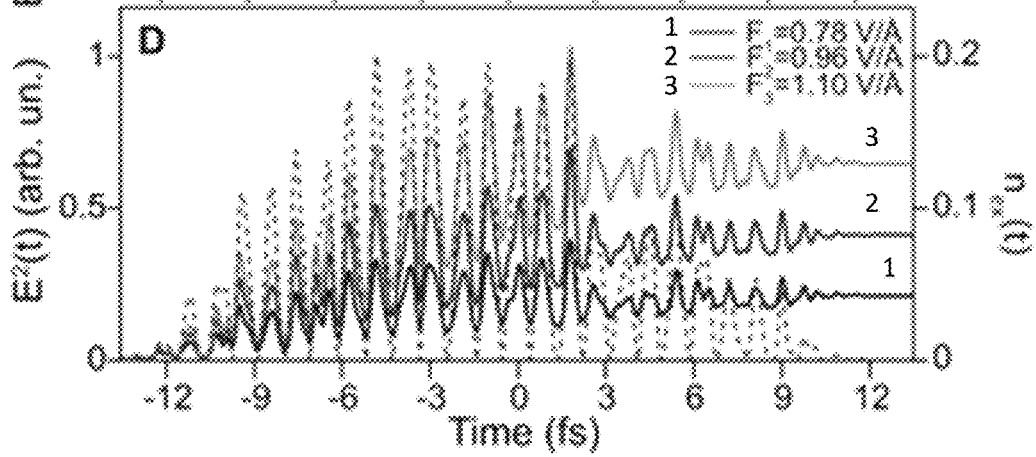
Figure 10:
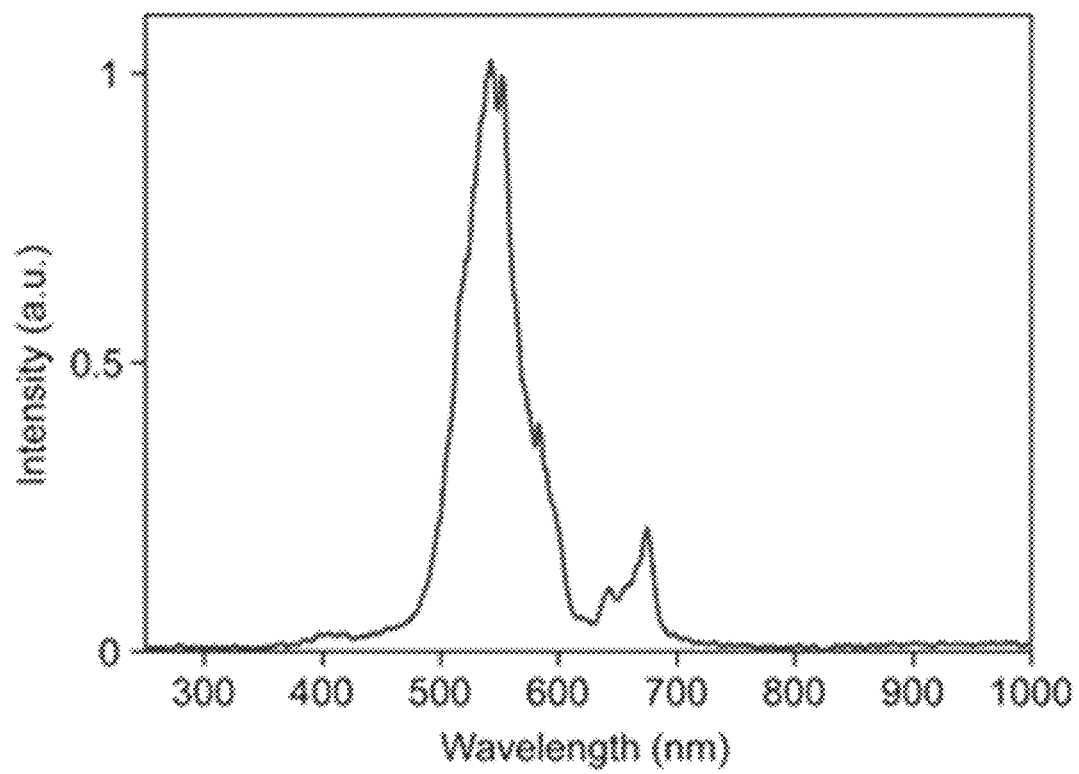
FIG. 10 provides the measured spectrum of the reflected probe beam (no smoothing) in the presence of the reflected pump beam. The spectrum shows no interference fringes indicating that the back reflected beam and the reflected pump beam are filtered out and not recorded in the presented spectrum modulation measurements in FIG. 3A.

The measured phase delay (FIG. 3B) is attributed to the electronic delay response in a strong optical drive field 210. The delay response can be seen to increase at higher driver field strengths due to the increase of the system's polarizability and the excited carriers' density. We calculated the number of excitation carriers at different field strengths using the measured electric field of the driver pulse 210. This electric field, depicted in FIG. 3C, is retrieved from the derivative of the measured reflectivity modulation trace of FIG. 3A, which represents the driver field's vector potential (see section on Supplemental Information, below). Remarkably, the retrieved temporal intensity profile of the driver field ($\tau_{FWHM}=10.5$ fs) is similar to the measured temporal profile obtained with a well-known in the art Transient-Gating Frequency-Resolved Optical Gating (TG-FROG) measurement ($\tau_{FWHM}=10.3$ fs), as shown in FIG. 10. The calculated number of excited carriers $n_{ex}$ (t) (as explained in section on Supplemental Information, below) at different field strengths is shown in FIG. 3D in solid lines in comparison with the instantaneous intensity of the carrier's triggering field (plotted in a dashed line). The total number of excited carriers at field strength $F_2=0.96$ V/A and $F_3=1.1$ V/A is almost double (1.86 times) and triple (2.9 times) that of excited carriers triggered by the field strength $F_1=0.78$ V/Å, respectively. The number of excited carriers plays a significant role in the electronic delay response due to the electron-electron interaction and the screening effect.

Embodiment of all-Optical Light Field Sampling and Experimental Verification of Same The demonstrated direct connection between the modulation of reflectivity (in the example of the experiment discussed in reference to FIG. 2; but more generally—the modulation of an optical parameter) of the dielectric system 214 and the profile of the incident driver field 210 allowed for formulation of a direct, real-time, experimentally simple all-optical light field sampling metrology. To demonstrate the basic principle of this new metrological tool, first, a numerical simulation was conducted to calculate the variation(s) of the measured reflectivity, and the field reflected at the SiO$_2$ thin substrate 214 in a strong optical field 210 that contained a one-optical-field-cycle optical pulse (which spanned over a broad spectral band and was centered at about 800 nm) at different field strengths (for details of the calculations, see section on Supplemental Information, below)

Figure 11:
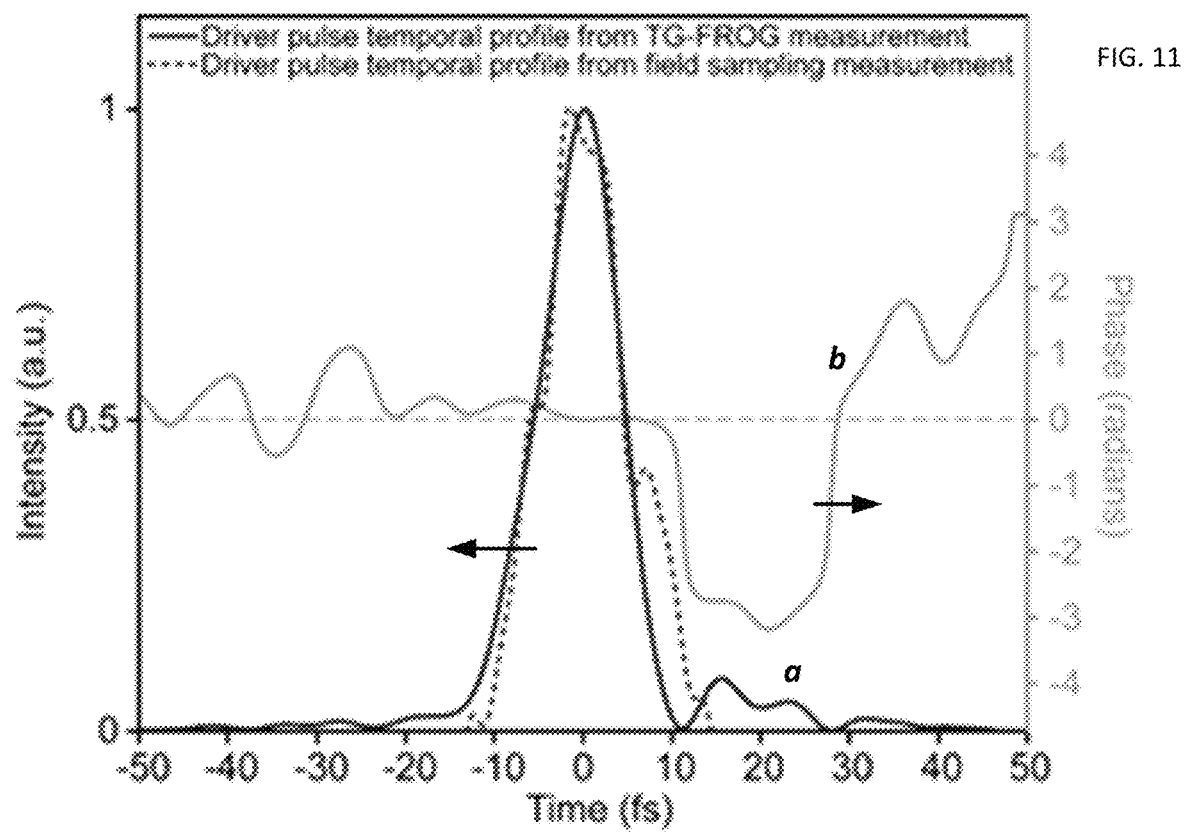
FIG. 11 illustrates that the temporal profile (shown in a dashed line) of a few-optical-filed-cycle pulse retrieved from the field sampling in FIG. 3C is in a good agreement to the temporal profile of the pulse constructed from the TG-FROG measurement (solid line a); the phase reconstructed from the TG-FROG measurement is shown in solid line b.

The reflected fields and incident fields were normalized, overlapped in time, and plotted in FIG. 11. The optical field 220A, carried by the probe beam 220 and reflected by the sample 214, was proved to follow, track substantially precisely the incident field at different intensities with a maximum standard deviation SD<1.5%. This calculation provided evidence that the time-dependent trace of modulation of reflectivity of a non-electrically-conducting target material caused by the strong field interaction with the target material 214 was following, repeating, mimicking the waveform of the driver/pump field 210.

To prove the viability of the proposed methodology experimentally, sampling of an a priori unknown synthesized waveform generated by four spectral channels (250-1000 nm) of the LFS apparatus was performed.

Figure 9:
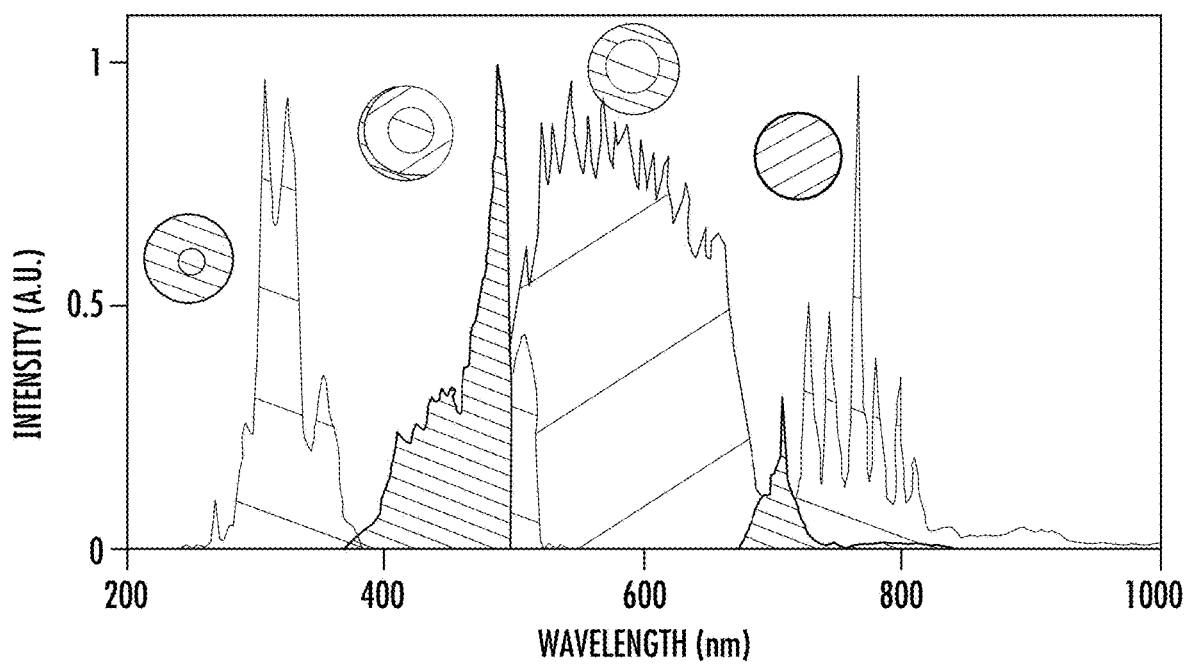
FIG. 9: Normalized spectra of the four channels of the LFS apparatus: the near-IR spectral channel ($Ch_{NIR}$) from 700 to 1000 nm, the visible spectral channel ($Ch_{VIS}$) from 500 nm to 700 nm, the visible and ultra-violet spectral ($Ch_{VIS-UV}$) from 350 nm- to 500 nm, and the deep ultra-violet spectral channel ($Ch_{DUV}$) from 250 nm to 350 nm.

In this experiment, the output beam from the LFS 900 (see FIG. 9A), with yet an unknown waveform, was divided into two separate beams (according to the implementation of the apparatus 200). The first high-intensity beam (pump or drive or driver) was used to alter the dielectric reflectivity of the target material (SiO$_2$ in one experiment). The pump beam's field strength was about 1.33V/Å (which was well below the damage threshold of the SiO$_2$ of about 2.7 V/Å). The second light beam (referred to as a probe) had a lower intensity (about 10% of the intensity of the driver beam). The spectrum of the probe beam spectrum was recorded as a function of the time delay between the pulses of the driver and the pulses of the probe (with delay increment of about 100 attoseconds). Then, the unknown synthesized waveform of the strong driver field (referred to herein as WF1) was retrieved from the recorded image/trace of the reflectivity modulation (here, average of three scans were normalized); such retrieved trace is plotted in FIG. 4B.

Next, the relative phase delay between one of the spectral channels (Ch$_{VIS-UV}$) and the other channels of the LFS 900 in the amount corresponding to a time delay of −2 fs was introduced to generate a new, different waveform WF2. The measured modulation of the reflectivity caused by interaction of WF2 with the target material is shown in FIG. 5A. Then, the time-dependency of the field of WF2 itself was obtained from the recorded image/trace of this reflectivity modulation; shown in a solid line in FIG. 5B.

The results of the calculation of the expected waveform of WF2 from WF1 are plotted synchronously with the time-sampled WF2 field in FIG. 5B in a dashed line (this expected waveform curve represents the results of analyzing the WF1 waveform to obtain the fields and relative delay phases between the individual four spectral channels of the LFS 900 that form the WF1 waveform, followed-up by introducing the −2 fs delay of Ch$_{VIS-UV}$ mathematically, and summing all fields of the four channels. The expected/calculated and measured fields of WF2 (FIG. 5B, dashed and solid lines, respectively) were in good agreement with one another (standard deviation of about 10%) and demonstrated similar time-dependent features.

Furthermore, the relative phase of the ultraviolet spectral channel ($Ch_{DUV}$) of the LFS source of light was also changed with respect to the other channels by −2 fs to generate yet another new waveform WF3. The measured modulation of reflectivity of the target sample produced by WF3 is shown in FIG. 6A. The retrieved time-distribution of the field of WF3 (solid line in FIG. 6B) is plotted together with the curve representing the calculated expected waveform (dashed black line). The estimated SD between the measured and expected waveforms was determined to be <10%.

With the advantage of the above-presented discussion, a skilled artisan will now readily appreciate that the asymmetric shape of the plots representing the reflectivity modulations in FIGS. 4A, 5A, 6A was caused by the increase in a number of excited carriers as it evolved in time depending on the field strength and the shape of the driver field waveform. Remarkably, the changes in the relative amplitudes of the main field cycles in WF1, WF2 and WF3 (marked by small black arrows in FIG. 4B, 5B, 6B)—associated with changing the relative phase(s) between/among the LFS channels—were successfully registered during the measurements, indicating the high temporal resolution of the demonstrated approach of the optical field sampling. It can also be seen that the constructed spectrum—that is, the spectrum calculated from the Fourier transform of the measured field of WF1—is similar to the measured spectrum of the pulse of the driver field 210 (see FIGS. 9B, 9C).

This observed correlation indicates that the devised field sampling methodology is capable of resolving substantially all of the frequency components of the sampled waveforms across the span of at least two octaves (from about 250 nm to about 1000 nm).

The demonstrated all-optical field metrological methodology, which can be used under substantially any experimental conditions, enables the user of such methodology to register a direct connection between the triggering (few femtosecond/attosecond pulsed) optical field and the electron dynamics during the time-resolved measurements, thereby providing more insight into ultrafast physics dynamics of matter.

Attosecond Control of Electron Motion in a Non-Electrically-Conducting Material.

A skilled artisan having the advantage of the presented results will now readily appreciate that the light-field-induced electron motion in a non-electrically-conducing material (such as a dielectric, or a semiconductor, for example) can be substantially controlled on-demand by tailoring the shape of the driver (pump) field's with attosecond resolution. To implement such control, a few complex waveforms of the optical field 218 at the input of the measurement system 200 by changing relative phases and/or intensities of the optical fields in the four channels of the source of light (the LFS 900) to control the electron motion in the target medium (the $SiO_2$ sample 314, in this example). The influence of some of these complex synthesized waveforms of the pump optical field on the target material was then measured by tracing or imaging the modulation of reflectivity of the target sample altered via the electron dynamics (driven by such synthesized fields). The measurements were carried out according to methodology described above.

Overall, the dielectric's strong field interaction was utilized to determine the attosecond electronic delay response in dielectric. Also, an all-optical direct-simple approach to sample the light field spanning two octaves with attosecond resolution was demonstrated. This field sampling approach can be implemented in different environments and experiment setups to provide a real time connection between the ultrafast dynamics in matter and its driver field. Consequently, using this realistic sampled field in simulations, calculations, and fitting algorithms related to the measured spectroscopic response of matter would provide more accurate interpretation and more insight into the underlying physics of these dynamics. Moreover, we utilized synthesized waveforms to demonstrate a full control of electron motion in dielectric. This electron control would be used to develop the optical switches and the attosecond photonics, paving the way to extend the frontiers of modern electronics and data information processing technologies into the petahertz realm.

Supplemental Information.

(A) Embodiment(s) of a Source of Light Configured to Generate Input Beam 218.

While the description of such source of light (interchangeably referred to as a light filed synthesizer apparatus, or LFS, or LFS apparatus) can be found in, for example, M. T. Hassan et al., Attosecond photonics: Synthesis and control of light transients. *Review of Scientific Instruments* 83, 111301, 2012; or in M. T. Hassan et al., Optical attosecond pulses and tracking the nonlinear response of bound electrons. *Nature* 530, 66-70; 2016, below is provides a short description of relevant aspects of such LFS apparatus.

Figure 7:
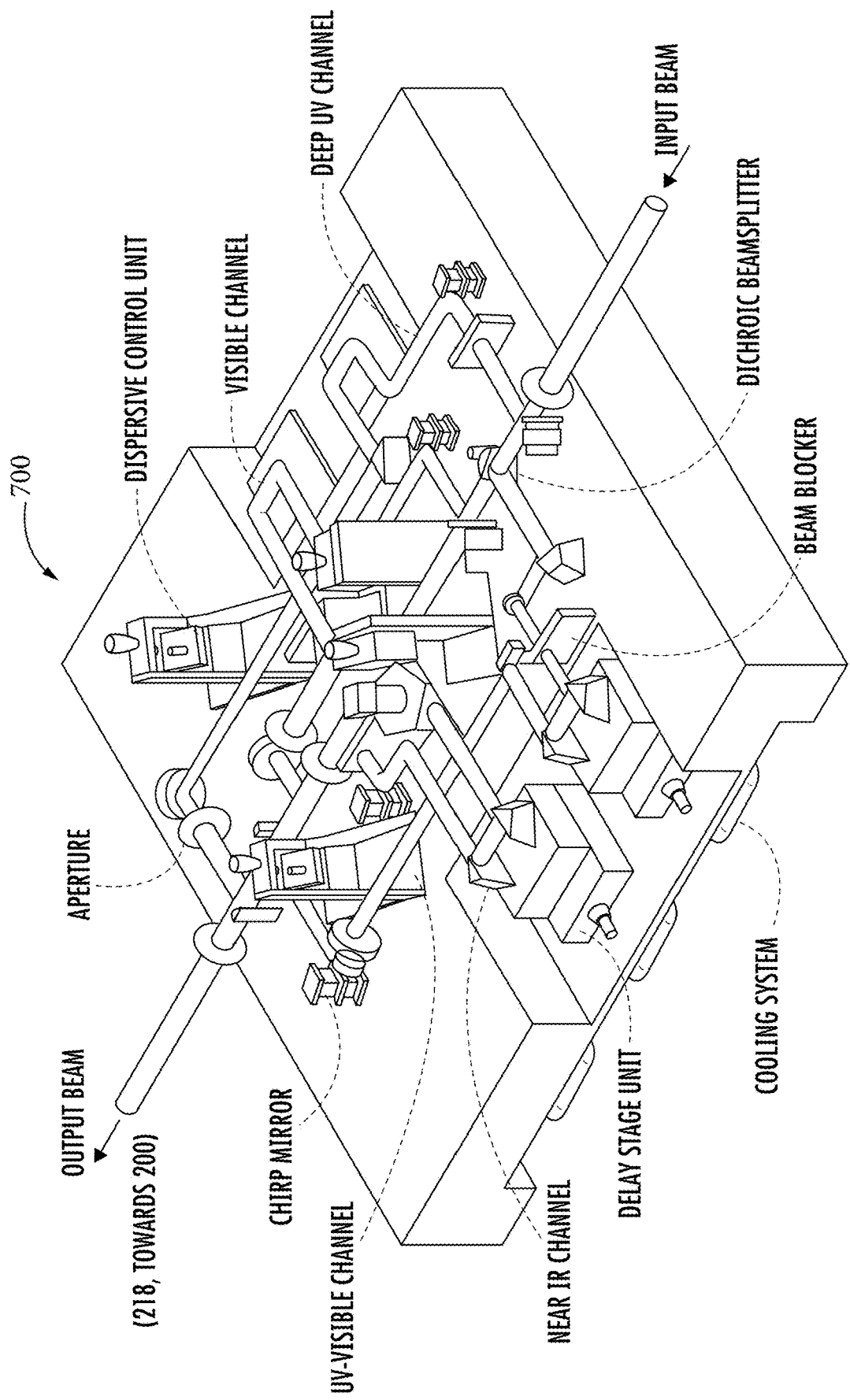
FIG. 7: Illustration of a Light Field Synthesizer (LFS) apparatus that includes four channels.
Figure 8:
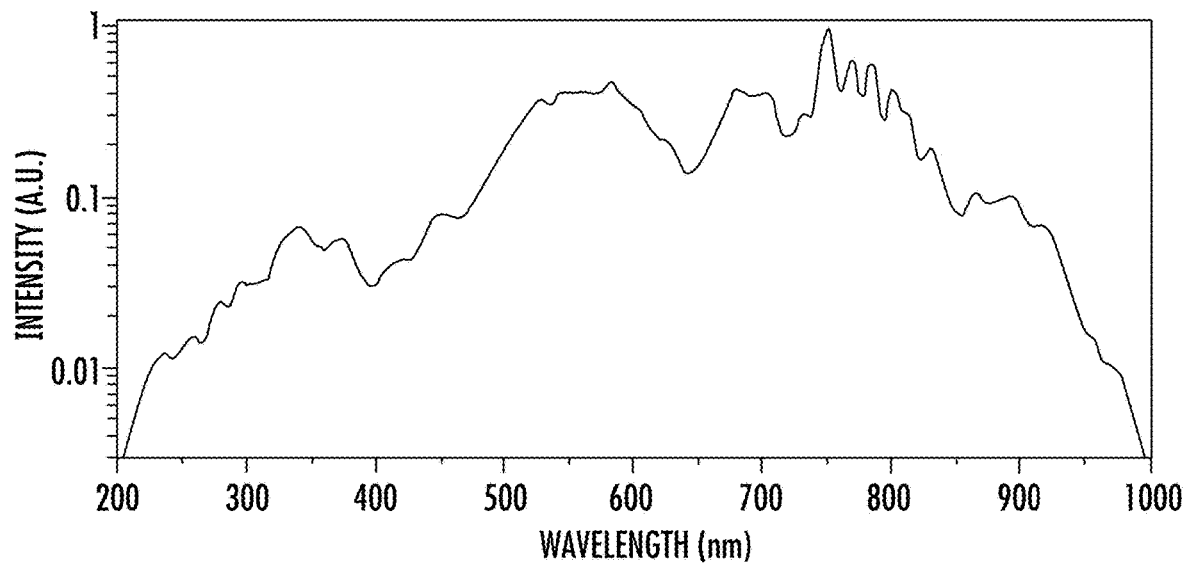
FIG. 8: Supercontinuum light generation spanning over more than two octaves.

A light field synthesizer apparatus or LFS (shown schematically as 900 in FIG. 7) included four spectral channels and was configured to tailor the light field in attosecond resolution for a broadband spectrum that spans over two octaves (250-1000 nm). The broadband supercontinuum was generated based on the nonlinear propagation of the multi-cycle laser pulses generated from an OPCPA-based laser system (repetition rate=10 KHz), carried at central wavelength ~790 nm, at 0.5 mJ, in a gas-filled hollow-core fiber. The output beam spectrum, extended over >2 octaves from 200-1000 nm, is shown in FIG. 8. Inside the LFS, the supercontinuum is spatially divided into four constituent channels with nearly equal bandwidth, utilizing dichroic beam splitters. Each channel spanned over approximately 0.5-octave (FIG. 9), as follows; $Ch_{NIR}$ spanned over the near-IR spectral region (700-1000 nm), $Ch_{VIS}$ spanned over the visible spectral region (500-700 nm), $Ch_{VIS-UV}$ spanned over the part of the visible and ultraviolet spectral region (350-500 nm), and $Ch_{DUV}$ spanned over the deep ultraviolet spectral region (250-350 nm). The pulses of the constituent channels of the synthesizer were temporally compressed with the use of six dispersive (chirped) mirrors.

Inside the LFS apparatus, a translation unit/device was implemented that carried a pair of mirrors in the path of each constituent channel to adjust the relative phases between the respective optical fields. The translation device included, at least in one case, a manually adjustable and piezoelectric translational stages used to control the relative phase delay between the LFS channels with the attosecond precision. Additionally, two neutral density filters were implemented in the beam paths of $Ch_{VIS}$ and $Ch_{NIR}$ channels to control the relative intensities between the four spectral channels. These constituent channel pulses are spatio-temporally superimposed—with the same type of beamsplitters- to generate synthesized waveforms at the exit of the LFS apparatus. The control and stabilization of the relative phases and intensities of light in the four channels enable the field synthesis of complex waveforms with attosecond resolution. (Some of the waveforms generated by the LFS 900 were measured and are discussed below in reference to FIGS. 4A, 4B, 5A, 5B, 6A, 6B.)

The relative powers of light in the four channels were set as follows: $Ch_{DUV}$=25 mW, $Ch_{VIS-UV}$=50 mW, $Ch_{VIS}$=200 mW, and $Ch_{NIR}$=50 mW. The relative phases between different pulses of light produced by the LFS 900 were passively and actively stabilized. The LFS apparatus 900 was implemented on a quasi-monolithic supporting structure in which the mounts hosting the optical components were directly attached to cast-aluminum baseplate. The LFS apparatus was passively thermostabilized with water cooling (at 19±0.05° C.) and enclosed in an aluminum housing that protected the optical setup against air fluctuations. Moreover, the LFS apparatus was actively stabilized to compensate for any drifts in the optical paths among different channels. The active phase stabilization scheme was based on active phase locking as demonstrated in *Review of Scientific Instruments* 83, 111301, 2012. In this scheme, a computer program was used to analyze the (few nanometer) interference spectra of four channels, and accordingly adjusted the position of the piezoelectric translational stage in each channel to correct and stabilize their relative optical lengths in real time. The rms value for the phase stabilization between $Ch_{NIR}$ and $Ch_{VIS}$ was about 74 mrad, between $Ch_{VIS}$ and $Ch_{VIS-UV}$—about 68 mrad, and between $Ch_{VIS-UV}$ and $Ch_{DUV}$—about 33 mrad.

A skilled artisan will readily appreciate now that the LFS source of light is configured to spatially separate a first beam of pulsed laser light having a first spectral bandwidth into a plurality of second beams of light (with a second beam of this plurality of the second beams of light having a corresponding second spectral bandwidth); to individually compress light pulses of at least two second beams, of the plurality of the second beams, to form a plurality of third beams of light (here, each third beam respectively corresponds to one of the second beams, and contains compressed light pulses having a corresponding compressed duration); and to substantially collinearly and temporally-coherently overlap at least two of the third beams to form a fourth beam of light, the fourth beam carrying light pulses.

A specific implementation of the LFS source of light may satisfy at least one of the following conditions: (a) the source of light is configured to spatially separate the first beam of light into the plurality of the second beams of light by spatially separating the first beam of light into the plurality of the second beams of light while second spectral bandwidths, corresponding to different second beams, do not overlap with one another; (b) the source of light is configured to individually compress the light pulses of the second beams by individually compressing light pulses of each of the second beams; (c) the source of light is configured to collinearly and temporally-coherently overlap at least two of the third beams by collinearly and temporally-coherently overlapping all of the third beams; (d) the source of light is configured to individually compress the light pulses of the second beams by carrying one or more of the following: (i) forming said plurality of third beams in which each of the compressed durations is shorter than 10 femtoseconds, and (ii) spatially separating the second beams from one another to pass said second beams along corresponding optical paths that differ from one another.

(B) Retrieving the Profile of Electric Component of Optical Field from the Image of Reflectivity Modulation In strong field interaction, the electric field of the driver pulse triggers the electron motion in the conduction band of the dielectric system, which modifies the nonlinear reflective index of the system and the reflectivity following the vector potential. The electrons with initial wave vector (q) move in the reciprocal space by acquiring a time-dependent wave vector $K_T$ (q, t) from the driving field, which can be expressed as $$K_T(q, t) = q + \frac{e}{\hbar} \int_{-\infty}^{t} F_X(z, t_1) dt_1 \qquad (1)$$

where $F_x(z, t_1)$ is the optical field strength, and e is the electron charge.

Therefore, all the electrons are shifted in the reciprocal space by the same wave vector $\Delta q(t)$ expressed as $$\Delta q(t) = \frac{e}{\hbar} \int_{-\infty}^{t} F_x(z, t_1) dt_1 \qquad (2)$$

In the presented experiments, the measurement of the relative electronic delay response (see FIGS. 3A-3D), all-optical field sampling measurements (FIGS. 4A, 4B, 5A, 5B, 6A, 6B), and the demonstration of the quantum electron motion control (FIGS. 7, 8), the electric fields were retrieved from the measured reflectivity modulation according to the following procedure:

First, record spectrum of the probe light field as a function of time delay between the pump and probe pulses.

Second, integrate the individual spectrum measured at each instant of the time delay to produce the image/trace of reflectivity modulation.

Then, subtract the mean value and normalize the trace to the maximum value. This reflectivity modulation trace reflects the vector potential of the driver field, which causes the electron shift in the conduction band as described by Eq. (1). Hence, the electric field can be calculated by taking the derivative of the measured traces:

$$E(T) = \frac{\partial A(t)}{\partial t} \qquad (3)$$

The time-dependent electric field was preferably calculated in the frequency domain to filter out the high-frequency noise in the measured data as shown in Eq. (4), where $A(\omega)$ is the Fourier transform of A(t), and $H(\omega)$ is the bandpass filter.

$$E(T) = \int_{-\infty}^{\infty} i\omega \cdot A(\omega) \cdot H(\omega) \cdot e^{i\omega t} d\omega \qquad (4)$$

Here, $$H(\omega) = \exp\left(-\frac{(\omega - \omega_0)^{order}}{2 * \sigma^{order}}\right) \qquad (5)$$

The spectral window can be selected by changing the $\sigma$ and $\omega_0$.

(C) Calculation of the Excitation Carrier Density ($n_{ex}$ (t))

The first-principles calculations of electron dynamics (in a target non-electrically-conducting sample, in one example—$SiO_2$) induced by the retrieved electric field (see discussion in reference to FIG. 3C) was performed based on the change of reflectivity modulation with the use of the time-dependent density functional theory (TDDFT; presented by Runge, E. & Gross, E. K. in Density-functional theory for time-dependent systems. *Physical Review Letters* 52, 997, 1984).

All the calculations were performed using the SALMON code (see Noda, M. et al. Salmon: Scalable ab-initio light-matter simulator for optics and nanoscience. Computer Physics Communications 235, 356-365 (2019; see also salmon-tddft.jp).

The electronic motion in a unit cell of solid is described by the time-dependent Kohn-Sham (TDKS) Eq. (6), $$i\hbar \frac{\partial w_{nk}(r, t)}{\partial t} = \left[\frac{1}{2m}\left\{-i\hbar\nabla + \hbar k + \frac{e}{c}A(t)\right\}^2 + V_{ion}(r) + V_H(r, t) + V_{xc}(r, t)\right]w_{nk}(r, t), \quad (6)$$

where $w_{nk}(r, t)$ is the time-dependent Bloch orbital with n and k being the band index and Bloch wavenumber, respectively. The vector potential A(t) is spatially uniform and is related to the applied electric field E(t) by E(t)=−(1/c)(d/dt) A(t). $V_{ion}(r)$, $V_H(r, t)$, and $V_{xc}(r, t)$ are the ionic, Hartree, and exchange-correlation potentials, respectively.

The norm-conserving pseudopotentials for $V_{ion}(r)$ and the adiabatic local density approximation were employed for $V_{xc}(r, t)$. The excitation carrier density $n_{ex}(t)$ was defined as follows:

$$n_{ex}(t) = \frac{1}{N_k}\sum_{k,v,c}\left|\int dr\, u^*_{c,k+eA(t)/c}(r)w_{vk}(r, t)\right|^2, \quad (7)$$

where $u_{nk}(r)$ is the Bloch orbital in the ground state, $N_k$ is the number of k-points, and v (c) is the index of the valence (or conduction) band.

The polarization axis of the applied electric field was set parallel to the (001) axis. The vector potential was prepared with the spline interpolation of the measured values. The following numerical parameters were used: the unit cell was discretized by a uniform grid of 20×36×50. The Brillouin zone was sampled by a k-grid of 4×4×4. The calculations were performed using 60,000 iteration steps for a time window of 30 fs.

(D) Simulation of Interaction of the Strong Field with Non-Electrically-Conducting Material A light-propagation calculation is performed using a multiscale Maxwell-TDDFT method to obtain the reflected field from a $SiO_2$ sample (which represents the modulation change in the reflectivity properties of the dielectric in a strong field). The input field is a one-cycle pulse, centered at 800 nm and spans over a broadband spectrum. The field strengths used in the simulations were: 1.23, 1.74, 2.13, and 2.46 V/Å.

In this method, the Maxwell equations that describe a macroscopic light propagation and the TDKS equation that describes microscopic electronic motion are coupled with a coarse-graining approximation. For a light pulse irradiating normally on the α-quartz sample, a one-dimensional propagation of the pulsed light is described using the vector potential $A_X(t)$ that satisfies:

$$\left(\frac{1}{c^2}\frac{\partial^2}{\partial t^2} - \frac{\partial^2}{\partial X^2}\right)A_X(t) = \frac{4\pi}{c}J_X(t), \quad (8)$$

where X is a macroscopic coordinate along the (100) axis. The polarization axis was set parallel to the (001) axis. We solve this equation using a one-dimensional uniform grid. At each grid point of X inside the sample, Bloch orbitals $w_{nk,X}(r, t)$ were prepared that that satisfied the TDKS Eq. (6). The current density at the grid point X, $J_X(t)$, is obtained from the Bloch orbitals as follows:

$$J_X(T) = -\frac{e}{m}\int_\Omega \frac{d^3r}{\Omega}\sum_{k,v} w^*_{vk,X}(r, t)\left(-i\hbar\nabla + \hbar k + \frac{e}{c}A_X(t)\right)w_{vk,X}(r, t) + J_{NL,X}(t), \quad (9)$$

where $\Omega$ is the volume of the unit cell and $J_{NL,X}(t)$ is the contribution from the nonlocal part of the ionic pseudopotentials.

The TDKS Eq. (6) at each X grid point was solved as discussed above. The sample thickness was set to 3.39 m, employed were 256 grid points for the macroscopic coordinate X inside the sample, and a grid spacing of 13.2 nm was utilized. The Bloch orbital at each macroscopic grid point was initially set to the ground state, and the incident light pulse was set to the vector potential in the vacuum region in front of the sample. Solving the one-dimensional wave equation and the TDKS equations simultaneously, the profile of the reflected pulse was devised at the end of the calculation. The incident field and the calculated reflected field are plotted in contrast for different field strengths in FIGS. 12A, 12B, 12C, and 12D. Both fields reveal a significant agreement (with SD<1.5%), thereby providing evidence that the reflectivity modulation in a non-electrically-conducting (for example, dielectric) material in the strong field substantially follows and represents the shape of the incident field.

Assessment of the expected waveforms of WF2 and WF3 (presented in FIGS. 5B, 6B in black dashed lines) was carried out as follows:

(i) The electric field at the output of the individual channel of the LFS 900, that contributed to the synthesis of the measured driver pulse waveform, was extracted by applying spectral filtering with different bandwidths (250-350 nm, 350-500 nm, 500-700 nm, and 700-1000 nm for $Ch_{DUV}$, $Ch_{VIS-UV}$, $Ch_{VIS}$, and $Ch_{NIR}$, respectively) in the frequency domain (using Eq. (4)), following by conversion of each channel's field to the time domain. Note, these spectral bandwidths were determined from the measured spectrum of each channel.

(ii) The relative phases of the LFS's channels were changed mathematically (as implemented experimentally) and then all the LFS channels' fields were summed up to obtain the expected waveform.

(iii) The profile of the newly synthesized waveform was compared with the expected one.

Figure 13:
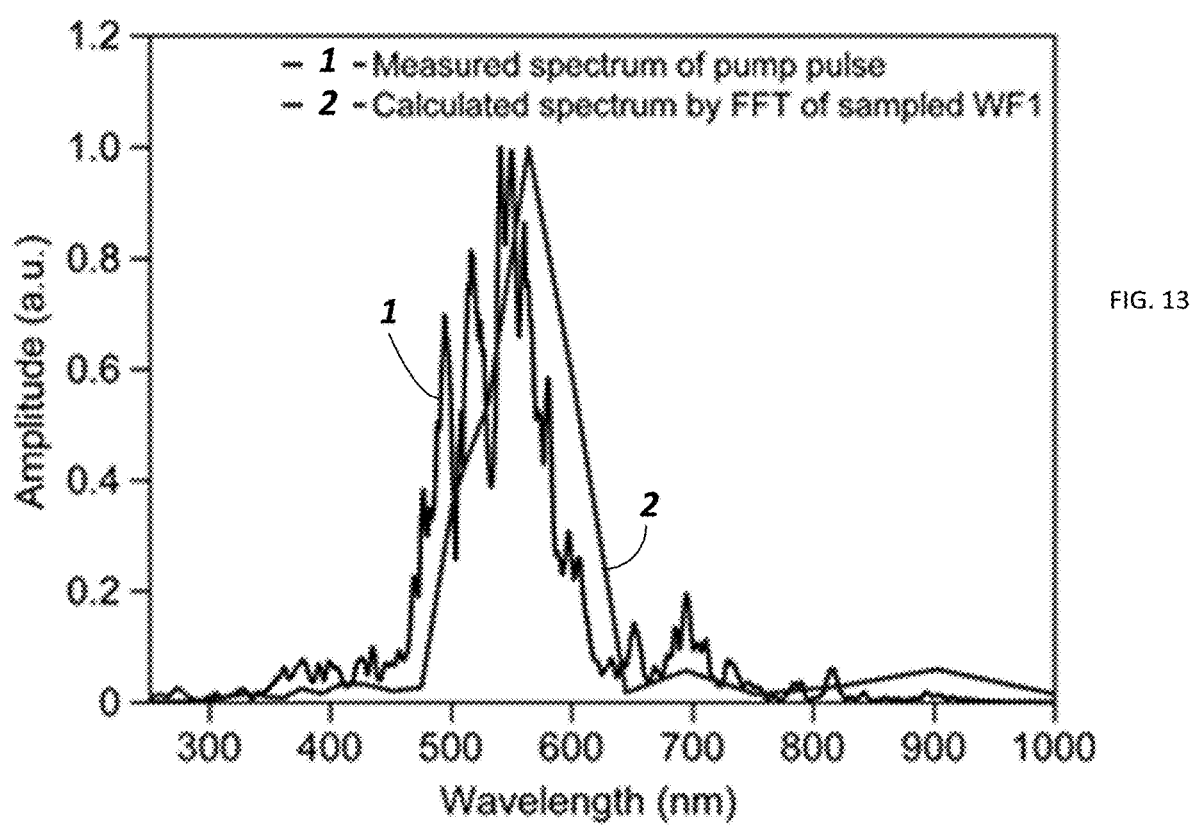
FIG. 13: The measured spectrum of the pump pulse (WF1) is shown as line 1, and the calculated spectrum (line 2) determined with the Fourier Transform of the electric field of sampled WF1 shown in FIG. 3B.

In the field sampling experiment discussed in reference to FIGS. 4A, 4B, 5A, 5B, 6A, 6B, the calculated spectrum obtained with the use of the Fourier transform of sampled WF1 was plotted in comparison with the measured spectrum of the probe pulse (which is identical to the pump pulse, by the very nature of the experiment performed with the use o the apparatus 200) as shown in FIG. 13.

Figure 14A:
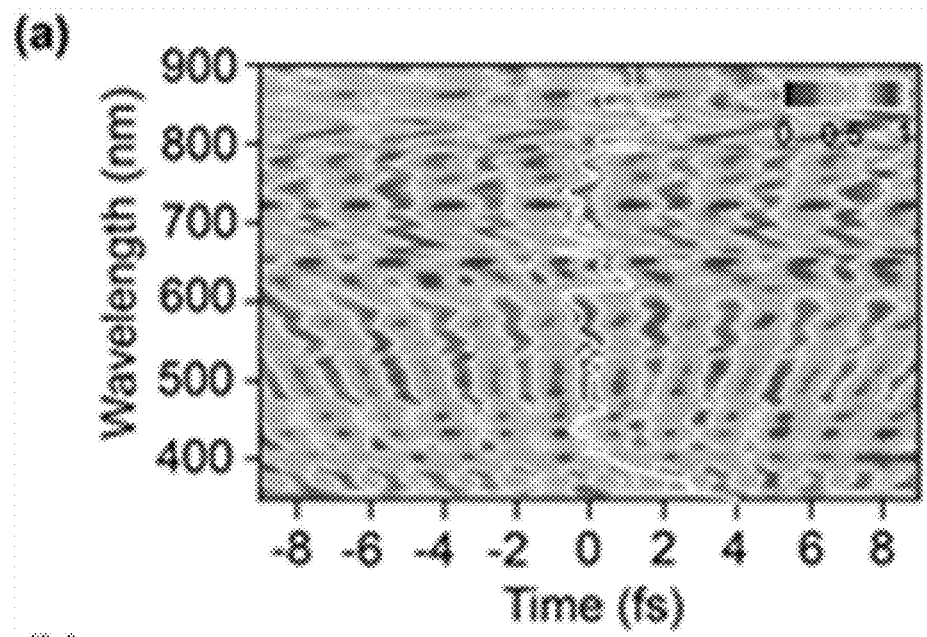
FIG. 14A presents a normalized measured spectrogram of modulation of reflectivity of a target sample.
Figure 14B:
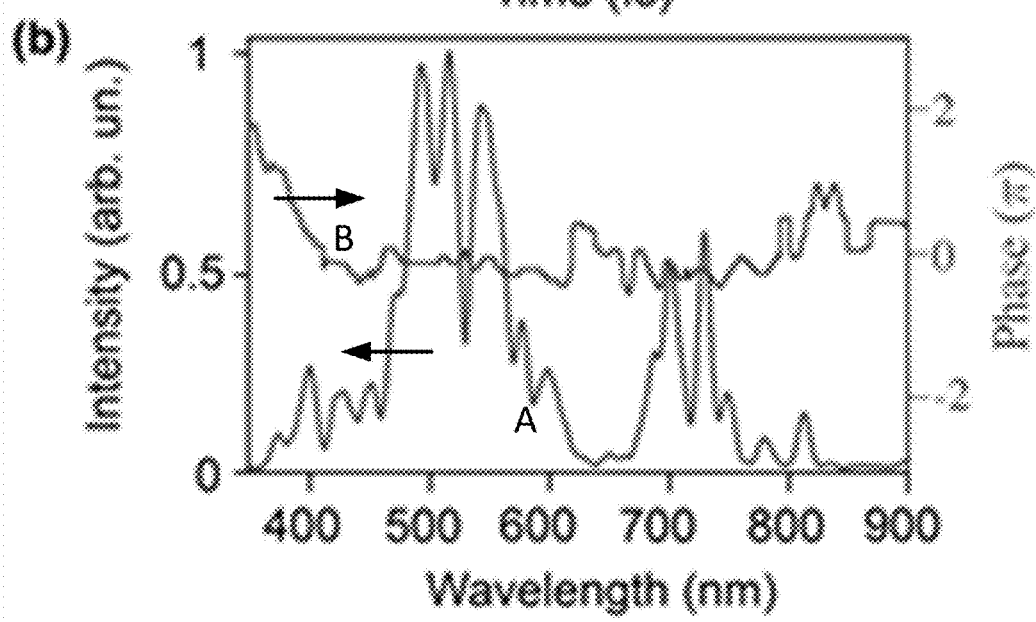
FIG. 14B includes plots of the measured spectra (curve A) and the retrieved spectral phase (curve B) of the drive pulse retrieved from the spectrogram of FIG. 14A.

Notably, the representation of the modulation of the optical characteristic of the target sample 214 (such as reflectivity, for example) caused by the drive optical field in the form of a normalized spectrogram—that is, as a function of both time and wavelength of light, as schematically shown in FIG. 14A—allows to not only determine the spectrum of the drive pulse of light but also the spectral phase of such drive pulse. Accordingly, the proposed methodology affords a substantially complete characterization of a pulse of light.

The disclosure of each and every of publications and/or patent documents referred to in this application is incorporated herein by reference.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. Other specific examples of the meaning of the terms "substantially", "about", and/or "approximately" as applied to different practical situations may have been provided elsewhere in this disclosure.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

While the invention is described through the above-described specific non-limiting embodiments, it will be understood by those of ordinary skill in the art that modifications to, and variations of, the illustrated embodiments may be made without departing from the inventive concepts disclosed herein. The disclosed aspects may be combined in ways not listed above. Accordingly, the invention should not be viewed as being limited to the disclosed embodiment(s).

The invention claimed is:

1. A method comprising:
   (11a) receiving an input beam of light at the input of an apparatus that comprises:
      the input of the apparatus configured to receive an input beam of light carrying input light pulses;
      a light-divider component structured to spatially-divide the input beam of light received at the input of the apparatus into a drive beam of light and a probe beam of light; and
      a first optical system configured to change a degree of divergence of at least one of the drive beam of light and the probe beam of light and direct said drive and probe beams of light towards a predetermined spatial location;
      a light-collection system disposed to acquire light of the probe beam of light that has arrived to the light-collection system from the predetermined spatial location; and
      a programmable electronic circuitry operably cooperated with a tangible non-transitory storage medium containing program code thereon, wherein the program code, when loaded to the programmable electronic circuitry, enables the electronic circuitry:
      a) to acquire an output from the light-collection system, said output representing time-dependent optical characteristic of a medium at the predetermined spatial location, and
      b) to produce in real time an image representing a temporal profile of an optical field of the drive beam of light;
   and
   (11b) with the use of said apparatus, producing an image representing a temporal profile of a drive optical field of the drive beam of light by performing at least the following actions:
      modulating an optical characteristic of a target material positioned at the predetermined spatial location by irradiating the target material with a first pulse of the drive optical field of the drive beam of light, said drive optical field being configured to include pulsed light containing at least half a cycle of the drive optical field;
      illuminating said target material with a second pulse of a probe optical field of a probe beam of light, the probe optical field being substantially coherent with the drive optical field;
      with an optical detector of the light-collecting system of the apparatus, acquiring said light of the probe beam of light that has interacted with the target material to image a temporal profile of said drive optical field, wherein said acquiring includes collecting said light of the probe beam of light in at least one of reflection from and transmission through the target material; and
      generating an image of the optical characteristic of said target material, the optical characteristic including at least one of optical reflectivity and optical transmissivity.

2. A method according to claim 1, comprising:
varying a time delay between the first and second pulses to generate the image of the optical characteristic of the target material,
wherein, in said image, a modulation of the optical characteristic of the target material caused by said irradiating is presented in a time-dependent fashion with at least a femtosecond temporal resolution or a sub-femtosecond temporal resolution.

3. A method according to claim 1, comprising:
transforming said image of the optical characteristic of said target material to the image of the temporal profile of the drive optical field.

4. A method according to claim 1, further comprising:
producing an image representing a temporal profile of the optical field of the drive beam of light with a femtosecond or sub-femtosecond resolution in real time.

5. A method according claim 1, wherein said illuminating is carried out substantially simultaneously with said modulating.

6. A method according to claim 1, wherein at least one of said modulating and said illuminating includes subjecting the target material to interaction with a corresponding pulse of light having a femtosecond duration or a sub-femtosecond duration.

7. A method according to claim 1, wherein at least one of the following conditions is satisfied:
(18a) the method further comprises introducing a time delay between the first pulse and the second pulse prior to or simultaneously with at least one of said modulating and said illuminating; and
(18b) the method further comprises spatially overlapping the drive beam of light and the probe beam of light at the target material by said irradiating and said illuminating.

8. A method according to claim 1, comprising at least one of the following:
(19a) spatially splitting the input beam of light into the drive beam of light carrying said drive optical field and the probe beam of light carrying said probe optical field;
(19b) spatially-independently changing a degree of spatial divergence of at least one of the drive and probe beams of light.

9. A method according to claim 8, wherein said spatially splitting includes passing the input beam of light through first and second apertures in a substantially optically opaque screen.

10. A method according to claim 1, wherein the method is devoid of using a second harmonic of the drive optical field and/or using a third harmonic of the drive optical field and/or using a phase-retrieval algorithm.

11. A method according to claim 1, wherein said image representing the temporal profile of the drive optical field represents an oscillating function but does not represent an envelope of said oscillating function.

12. A method comprising:
(24a) receiving an input beam of light at an input of an apparatus that comprises:
the input of the apparatus configured to receive the input beam of light carrying input light pulses;
a light-divider component structured to spatially-divide the input beam of light received at the input into a drive beam of light and a probe beam of light; and
a first optical system configured to change a degree of divergence of at least one of the drive beam of light and the probe beam of light and direct said drive and probe beams of light towards a predetermined spatial location;
a light-collection system disposed to acquire light of the probe beam of light that has arrived to the light-collection system from the predetermined spatial location; and
a programmable electronic circuitry operably cooperated with a tangible non-transitory storage medium containing program code thereon, wherein the program code, when loaded to the programmable electronic circuitry, enables the electronic circuitry
c) to acquire an output from the light-collection system, said output representing time-dependent optical characteristic of a medium at the predetermined spatial location; and
d) to produce in real time an image representing a temporal profile of an optical field of the drive beam of light;
and
(24b) with the use of said apparatus, producing an image representing a temporal profile of a drive optical field of the drive beam of light by performing at least the following actions:
modulating an optical characteristic of a target material positioned at the predetermined spatial location by irradiating the target material with a first pulse of the drive optical field of the drive beam of light, said drive optical field configured to include pulsed light containing at least half a cycle of the drive optical field;
illuminating said target material with a second pulse of a probe optical field of the probe beam of light, the probe optical field being substantially coherent with the drive optical field; and
with an optical detector of the light-collecting system of the apparatus, acquiring light of the probe beam of light that has interacted with the target material to produce the image representing the temporal profile of said drive optical field, wherein said image representing the temporal profile of the drive optical field represents an oscillating function but does not represent an envelope of said oscillating function.

13. A method according to claim 12, comprising:
varying a time delay between the first and second pulses to generate the image of the optical characteristic of the target material,
wherein, in said image, a modulation of the optical characteristic of the target material caused by said irradiating is presented in a time-dependent fashion with at least a femtosecond temporal resolution or a sub-femtosecond temporal resolution.

14. A method according to claim 12, comprising:
transforming said image of the optical characteristic of said target material to the image of the temporal profile of the drive optical field.

15. A method according to claim 12, comprising:
producing the image representing the temporal profile of the optical field of the drive beam of light with a femtosecond or sub-femtosecond resolution in real time.

16. A method according to claim 12, wherein said illuminating is carried out substantially simultaneously with said modulating.

17. A method according to claim 12, wherein at least one of said modulating and said illuminating includes subjecting the target material to interaction with a corresponding pulse of light having a femtosecond duration or a sub-femtosecond duration.

18. A method according to claim 12, wherein at least one of the following conditions is satisfied:
   (29a) the method further comprises introducing a time delay between the first pulse and the second pulse prior to or simultaneously with at least one of said modulating and said illuminating; and
   (29b) the method further comprises spatially overlapping the drive beam of light and the probe beam of light at the target material by said irradiating and said illuminating.

19. A method according to claim 12, comprising at least one of the following:
   (30a) spatially splitting the input beam of light into the drive beam of light carrying said drive optical field and the probe beam of light carrying said probe optical field;
   (30b) spatially-independently changing a degree of spatial divergence of at least one of the drive and probe beams of light.

20. A method according to claim 19, wherein said spatially splitting includes passing the input beam of light through first and second apertures in a substantially optically opaque screen.

* * * * *